(12) United States Patent
Kuennen et al.

(10) Patent No.: US 10,336,639 B2
(45) Date of Patent: Jul. 2, 2019

(54) GRAVITY FEED WATER TREATMENT SYSTEM

(71) Applicant: Access Business Group International LLC, Ada, MI (US)

(72) Inventors: Roy W. Kuennen, Caledonia, MI (US); Terry L. Lautzenheiser, Nunica, MI (US); Roy M. Taylor, Jr., Rockford, MI (US); William T. Stoner, Jr., Ada, MI (US); Kenneth E. Conrad, Ada, MI (US); Karen J. VanderKooi, Grand Rapids, MI (US); Brian S. Beals, Grand Rapids, MI (US); Ryan D. Schamper, Grand Haven, MI (US)

(73) Assignee: Access Business Group International LLC, Ada, MI (US)

( * ) Notice: Subject to any disclaimer, the term of this patent is extended or adjusted under 35 U.S.C. 154(b) by 447 days.

(21) Appl. No.: 15/139,636

(22) Filed: Apr. 27, 2016

(65) Prior Publication Data
US 2016/0236958 A1   Aug. 18, 2016

Related U.S. Application Data

(63) Continuation of application No. 13/144,302, filed as application No. PCT/US2010/020728 on Jan. 12, 2010, now Pat. No. 9,352,979.
(Continued)

(51) Int. Cl.
*C02F 1/28* (2006.01)
*C02F 1/52* (2006.01)
(Continued)

(52) U.S. Cl.
CPC ............. *C02F 9/005* (2013.01); *C02F 1/003* (2013.01); *C02F 1/281* (2013.01); *C02F 1/283* (2013.01);
(Continued)

(58) Field of Classification Search
CPC .......... C02F 1/003; C02F 1/281; C02F 1/283; C02F 1/52; C02F 1/688; C02F 1/76;
(Continued)

(56) References Cited

U.S. PATENT DOCUMENTS

| | | | |
|---|---|---|---|
| 3,016,146 A | 1/1962 | Smith et al. | |
| 3,385,483 A | 5/1968 | Gilwood | |

(Continued)

FOREIGN PATENT DOCUMENTS

| | | |
|---|---|---|
| CA | 2 035 512 | 8/1991 |
| CN | 101357793 | 2/2009 |

(Continued)

OTHER PUBLICATIONS

Partial International Search Report for PCT Application No. PCT/US2016/033401 dated Aug. 19, 2016.
(Continued)

*Primary Examiner* — Lucas A Stelling
(74) *Attorney, Agent, or Firm* — Warner Norcross + Judd LLP

(57) ABSTRACT

A portable water treatment system includes at least one sub-system to treat water including a flocculation system, a chlorination system, and a bio-sand filter system. The water treatment system may include multiple sub-systems for treating water that feed into one another. The sand filter system may include a mini bio-sand filter, a foam filter, or a pressed block filter. The flocculation system may include a tank bottom that urges settling particles toward a sump and a ladle that removes settled particles. A manual pump or siphon may be included in the water treatment system.

14 Claims, 29 Drawing Sheets

Related U.S. Application Data

(60) Provisional application No. 61/238,177, filed on Aug. 30, 2009, provisional application No. 61/173,458, filed on Apr. 28, 2009, provisional application No. 61/150,779, filed on Feb. 8, 2009, provisional application No. 61/144,323, filed on Jan. 13, 2009.

(51) Int. Cl.

| | | |
|---|---|---|
| *C02F 1/68* | (2006.01) | |
| *C02F 1/76* | (2006.01) | |
| *C02F 3/04* | (2006.01) | |
| *C02F 3/06* | (2006.01) | |
| *C02F 9/00* | (2006.01) | |
| *C02F 1/00* | (2006.01) | |
| C02F 103/00 | (2006.01) | |
| C02F 101/10 | (2006.01) | |

(52) U.S. Cl.
CPC ............... *C02F 1/52* (2013.01); *C02F 1/688* (2013.01); *C02F 1/76* (2013.01); *C02F 3/06* (2013.01); *C02F 1/001* (2013.01); *C02F 3/04* (2013.01); *C02F 9/00* (2013.01); *C02F 2101/103* (2013.01); *C02F 2103/002* (2013.01); *C02F 2201/006* (2013.01); *C02F 2209/40* (2013.01); *C02F 2301/043* (2013.01); *C02F 2303/16* (2013.01); *C02F 2303/185* (2013.01); *Y02W 10/15* (2015.05)

(58) Field of Classification Search
CPC .... C02F 3/06; C02F 9/00; C02F 9/005; C02F 2101/103; C02F 2103/002; C02F 2201/006; C02F 2209/40; C02F 2301/043; C02F 2303/16; C02F 2303/185; C02F 1/001; C02F 3/04; Y02W 10/15
See application file for complete search history.

(56) References Cited

U.S. PATENT DOCUMENTS

| | | | |
|---|---|---|---|
| 3,563,385 | A | 2/1971 | Bykov |
| 3,744,639 | A | 7/1973 | Teeple, Jr. et al. |
| 3,835,045 | A | 9/1974 | Hussissian |
| 4,419,235 | A | 12/1983 | Sway |
| 4,427,548 | A | 1/1984 | Quick, Jr. |
| 4,443,336 | A | 4/1984 | Bennethum |
| 4,474,620 | A | 10/1984 | Hall |
| 4,477,347 | A | 10/1984 | Sylva |
| 4,623,457 | A | 11/1986 | Hankammer |
| 4,988,436 | A | 1/1991 | Cole |
| 5,019,278 | A | 5/1991 | Jacquet |
| 5,135,654 | A | 8/1992 | Heskett |
| 5,264,129 | A | 11/1993 | Simpson et al. |
| 5,322,625 | A | 6/1994 | Rise |
| 5,360,556 | A | 11/1994 | Ball et al. |
| 5,366,642 | A | 11/1994 | Platter et al. |
| 5,413,706 | A | 5/1995 | Graves |
| 5,421,995 | A | 6/1995 | Norcross |
| 5,433,848 | A | 7/1995 | Platter et al. |
| 5,466,374 | A | 11/1995 | Bachhofer et al. |
| 5,534,145 | A | 7/1996 | Platter et al. |
| 5,536,396 | A | 7/1996 | Mudra et al. |
| 5,547,569 | A | 8/1996 | Spencer |
| 5,562,824 | A | 10/1996 | Magnusson |
| 5,580,447 | A | 12/1996 | Platter et al. |
| 5,616,241 | A | 4/1997 | Khudenko |
| 5,618,413 | A | 4/1997 | Todd et al. |
| 5,620,891 | A | 4/1997 | Drummond et al. |
| 5,628,900 | A | 5/1997 | Naito |
| 5,635,063 | A | 6/1997 | Rajan et al. |
| 5,647,977 | A | 7/1997 | Arnaud |
| 5,707,527 | A * | 1/1998 | Knutson ............... B01D 29/15 210/660 |
| 5,728,303 | A | 3/1998 | Johnson |
| 5,785,864 | A | 7/1998 | Teran et al. |
| D398,369 | S | 9/1998 | Hayes et al. |
| 5,843,308 | A | 12/1998 | Suozzo et al. |
| 5,858,219 | A | 1/1999 | Kusmierz et al. |
| 5,900,141 | A | 5/1999 | Takigawa et al. |
| 5,902,488 | A | 5/1999 | Prince |
| 5,980,739 | A | 11/1999 | Jowett et al. |
| 5,980,743 | A | 11/1999 | Bairischer |
| 5,993,672 | A | 11/1999 | Manz |
| 6,027,639 | A * | 2/2000 | Lenhart, Jr. ............ B01D 29/15 210/108 |
| 6,027,649 | A | 2/2000 | Benedek et al. |
| 6,080,313 | A | 6/2000 | Kelada |
| 6,099,728 | A | 8/2000 | Bairischer |
| 6,099,735 | A | 8/2000 | Kelada |
| 6,103,109 | A | 8/2000 | Noyes et al. |
| 6,120,690 | A | 9/2000 | Haase |
| 6,123,858 | A | 9/2000 | Manz |
| 6,248,244 | B1 | 6/2001 | Dann |
| D454,614 | S | 3/2002 | Marston |
| 6,358,411 | B1 | 3/2002 | McKinney |
| 6,379,549 | B1 | 4/2002 | LePoder et al. |
| 6,398,968 | B1 | 6/2002 | Higby |
| 6,416,668 | B1 | 7/2002 | Al-Samadi |
| 6,426,005 | B1 | 7/2002 | Larsson |
| 6,464,884 | B1 | 10/2002 | Gadgil |
| 6,475,386 | B1 | 11/2002 | Carr et al. |
| 6,572,769 | B2 | 6/2003 | Rajan et al. |
| 6,592,751 | B2 | 7/2003 | Haridas |
| 6,607,663 | B1 | 8/2003 | Dixon |
| 6,610,199 | B2 | 8/2003 | Bittner |
| 6,638,426 | B1 | 10/2003 | Fritter et al. |
| 6,641,737 | B2 | 11/2003 | Xia et al. |
| 6,663,783 | B2 | 12/2003 | Stephenson et al. |
| 6,780,332 | B2 | 8/2004 | Shiau et al. |
| 6,838,003 | B1 | 1/2005 | Espenan et al. |
| 6,890,433 | B2 | 5/2005 | Nurse, Jr. et al. |
| 6,902,667 | B1 | 6/2005 | Dunne |
| 6,936,176 | B1 | 8/2005 | Greene, III et al. |
| 6,949,187 | B2 | 9/2005 | Smith |
| 6,953,525 | B2 | 10/2005 | LeCraw |
| 7,011,749 | B2 | 3/2006 | Hayes et al. |
| 7,029,578 | B2 | 4/2006 | Spruce |
| 7,077,951 | B2 | 7/2006 | Monteiro |
| D545,395 | S | 6/2007 | Morgan et al. |
| 7,229,550 | B2 | 6/2007 | Haase |
| 7,276,161 | B2 | 10/2007 | Rajan et al. |
| 7,297,258 | B2 | 11/2007 | Gomes De Oliveira |
| D557,762 | S | 12/2007 | Novotny et al. |
| 7,309,429 | B2 | 12/2007 | Patil et al. |
| 7,374,676 | B2 | 5/2008 | Dew, Jr. |
| 7,378,015 | B2 | 5/2008 | Rinker et al. |
| 7,413,653 | B2 | 8/2008 | Powell |
| 7,413,663 | B2 | 8/2008 | Rajan et al. |
| 7,441,665 | B2 | 10/2008 | Bridges et al. |
| 7,470,369 | B2 | 12/2008 | Diallo |
| 7,473,362 | B1 | 1/2009 | Nohren, Jr. |
| 7,491,337 | B2 | 2/2009 | Karaman |
| 7,513,997 | B2 | 4/2009 | Del Porto |
| 7,553,418 | B2 | 6/2009 | Khudenko et al. |
| 7,592,173 | B1 | 9/2009 | Stamper et al. |
| 7,648,630 | B2 | 1/2010 | Broussard |
| 7,670,485 | B2 | 3/2010 | Duplessis et al. |
| 7,727,397 | B2 | 6/2010 | Gerardi et al. |
| 7,740,765 | B2 | 6/2010 | Mitchell et al. |
| D626,621 | S | 11/2010 | Olson et al. |
| 8,088,287 | B2 | 1/2012 | Dart et al. |
| 8,114,277 | B2 | 2/2012 | Jowett |
| 2002/0036172 | A1 | 3/2002 | Del Signore |
| 2002/0066698 | A1 | 6/2002 | Brunner |
| 2002/0117436 | A1 | 8/2002 | Rajan et al. |
| 2003/0196960 | A1 | 10/2003 | Hughes |
| 2003/0205518 | A1 | 11/2003 | VanderKooi et al. |
| 2003/0209477 | A1 | 11/2003 | Lacasse |
| 2003/0209499 | A1 | 11/2003 | Haase |
| 2004/0094465 | A1 | 5/2004 | Rajan et al. |

(56) References Cited

U.S. PATENT DOCUMENTS

| | | |
|---|---|---|
| 2004/0178131 A1 | 9/2004 | Monteiro |
| 2004/0195840 A1 | 10/2004 | Baarman et al. |
| 2005/0040113 A1* | 2/2005 | Howard ............... B01D 29/114 |
| | | 210/744 |
| 2005/0087500 A1 | 4/2005 | D'Emidio et al. |
| 2005/0109683 A1 | 5/2005 | Joyce et al. |
| 2006/0070947 A1 | 4/2006 | Conrad |
| 2006/0108275 A1 | 5/2006 | Cote |
| 2006/0138048 A1 | 6/2006 | Hu et al. |
| 2006/0151387 A1 | 7/2006 | Yost et al. |
| 2006/0226064 A1 | 10/2006 | Beckman et al. |
| 2006/0273000 A1 | 12/2006 | Chung |
| 2007/0158278 A1 | 7/2007 | Deschenes |
| 2007/0187334 A1 | 8/2007 | Davis et al. |
| 2007/0193930 A1 | 8/2007 | Marsh et al. |
| 2008/0023406 A1 | 1/2008 | Rawson et al. |
| 2008/0023407 A1 | 1/2008 | Eriksson et al. |
| 2008/0041775 A1 | 2/2008 | Baarman |
| 2008/0150618 A1 | 6/2008 | Chu |
| 2008/0173581 A1 | 7/2008 | Maclean |
| 2008/0202992 A1 | 8/2008 | Bridges et al. |
| 2008/0217258 A1 | 9/2008 | Buchan |
| 2008/0245092 A1 | 10/2008 | Forsberg et al. |
| 2008/0283469 A1 | 11/2008 | Pollock |
| 2008/0308493 A1 | 12/2008 | Amir et al. |
| 2009/0001011 A1 | 1/2009 | Knipmeyer et al. |
| 2009/0065412 A1 | 3/2009 | Mbarki et al. |
| 2009/0206030 A1 | 8/2009 | Baird et al. |
| 2010/0006508 A1 | 1/2010 | Mitchell et al. |
| 2010/0032358 A1 | 2/2010 | Vestergaard Frandsen |
| 2010/0065509 A1 | 3/2010 | Kerr et al. |
| 2010/0200484 A1 | 8/2010 | Premathilake et al. |
| 2011/0042286 A1 | 2/2011 | Schumm, III |
| 2011/0042308 A1 | 2/2011 | Krause et al. |
| 2011/0049058 A1 | 3/2011 | Unhoch |
| 2011/0056891 A1 | 3/2011 | Greene, III et al. |
| 2015/0197434 A1 | 7/2015 | Zou et al. |

FOREIGN PATENT DOCUMENTS

| | | |
|---|---|---|
| DE | 15 17 447 | 1/1970 |
| DE | 2 406 993 | 8/1975 |
| DE | 3 113 021 | 10/1982 |
| EP | 0 104 525 | 4/1984 |
| EP | 0 175 956 | 4/1986 |
| EP | 0 190 801 | 8/1986 |
| EP | 0 218 481 | 4/1987 |
| EP | 0 228 497 | 7/1987 |
| EP | 0 899 237 | 3/1993 |
| EP | 0 969 085 | 1/2000 |
| EP | 1 118 602 | 7/2001 |
| EP | 1 710 210 | 10/2006 |
| FR | 2 614 176 | 10/1988 |
| GB | 1 567 645 | 5/1980 |
| GB | 2 229 175 | 9/1990 |
| GB | 2 386 117 | 9/2003 |
| GB | 2 412 115 | 9/2005 |
| GB | 2 413 292 | 10/2005 |
| GB | 2 435 623 | 9/2007 |
| JP | S52-109747 | 9/1977 |
| JP | S56-087415 | 7/1981 |
| JP | S63-072306 | 4/1988 |
| JP | H07-051538 | 2/1995 |
| JP | H08-281026 | 10/1996 |
| JP | H10-057980 | 3/1998 |
| JP | 2003-062564 | 3/2003 |
| JP | 2008-296118 | 12/2008 |
| JP | 2011-251242 | 12/2011 |
| TW | 379589 | 1/2000 |
| TW | 496853 | 8/2002 |
| TW | 593168 | 6/2004 |
| TW | M264276 | 5/2005 |
| TW | I263529 | 10/2006 |
| WO | 86/04923 | 8/1986 |
| WO | 88/03432 | 5/1988 |
| WO | 94/13954 | 6/1994 |
| WO | 98/05401 | 2/1998 |
| WO | 98/23545 | 6/1998 |
| WO | 00/21635 | 4/2000 |
| WO | 01/54786 | 8/2001 |
| WO | 01/74725 | 10/2001 |
| WO | 02/40414 | 5/2002 |
| WO | 2004/074182 | 9/2004 |
| WO | 2005/003040 | 1/2005 |
| WO | 2005/095284 | 10/2005 |
| WO | 2007/011325 | 1/2007 |
| WO | 2007/036864 | 4/2007 |
| WO | 2008/049833 | 5/2008 |
| WO | 2010/045644 | 4/2010 |
| WO | 2012/000693 | 1/2012 |

OTHER PUBLICATIONS

International Search Report and Written Opinion of the International Searching Authority for International Application No. PCT/US2016/033401 dated Oct. 18, 2016.

International Search Report and Written Opinion of the International Searching Authority, International Application No. PCT/US2010/020728, dated May 27, 2010.

International Search Report and Written Opinion of the International Searching Authority, International Application No. PCT/US2011/062377, dated Feb. 3, 2012.

International Search Report and Written Opinion of the International Searching Authority, International Application No. PCT/US2011/062873, dated Feb. 22, 2012.

International Search Report and Written Opinion of the International Searching Authority, International Application No. PCT/US2012/022206, dated Mar. 21, 2012.

Ng, Ken "Treatment of Greenhouse Recirculation Water—Bio-Sand Filtration", publication by British Columbia Ministry of Agriculture, Food and Fisheries, Irrigation Fact Sheet, Jul. 1999, pp. 1-9.

Manz, David H., "Guidelines, Preparation of Media for the BioSand Water Filter, Four Layer System", Apr. 30, 2007, pp. 1-23.

Manz, David H., "BioSand Water Filter Technology Household Concrete Design", Apr. 30, 2007, pp. 1-38.

Suslow, Trevor V., "Water Disinfection—A Practical Approach to Calculating Dose Values for Preharvest and Postharvest Applications", University of California Agriculture and Natural Resources, Publication 7256, Copyright 2001, pp. 1-4.

"Promotion of Household Water Treatment and Safe Storage in UNICEF Wash Programmes", Publication by UNICEF, Jan. 2008, pp. 1-9.

Sobsey, Mark D., et al, "Point of Use Household Drinking Water Filtration: A Practical, Effective Solution for Providing Sustained Access to Safe Drinking Water in the Develpoing World", Environ. Sci. Technol., 2008, vol. 42, No. 12, pp. 4261-4267.

Bluestein, Adam "Blue is the New Green", Inc. Magazine, Nov. 2008, pp. 112, 188-126, 16.

"HydrAid—HydrAid BioSand Water Filter—Why HydrAid", downloaded from http://www.hydraid.org/solution/why-hydraid/, Dec. 18, 2008, pp. 1-2, 1.

Keller, Christina, "HydrAid BioSand Water Filter Handbook", publication by Cascade Engineering, Inc., copyright 2009, pp. 1-35.

Fogden, Josephine, "Access to Safe Drinking Water and Its Impact on Global Economic Growth—A Study for HaloSource, Inc.", publication by HaloSource, Inc., copyright 2009, pp. 1-66.

Vande Bunte, Matt, Cascade Engineering, DeVos' Windquest Group revive water filter project for use in developoing world, the Grand Rapids Press, Jan. 15, 2010, pp. 1-2.

Hope for Haiti email, copyright 2010, Cascade Engineering.

"How it Works" publication by HaloSource, copyright 2008-2011.

"Biosand Filter", publication by Water & Sanitation Rotarian Action Group.

Prior Art Devices.

\* cited by examiner

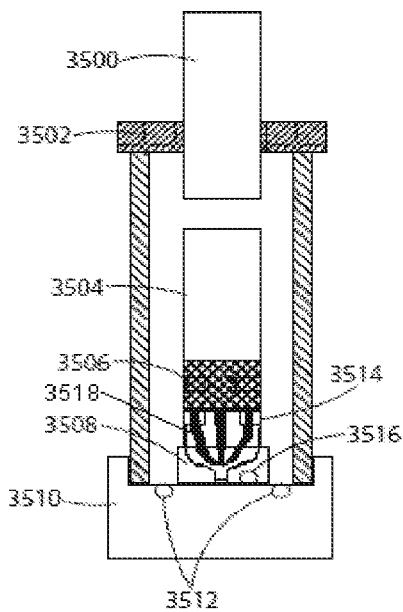
Fig. 35
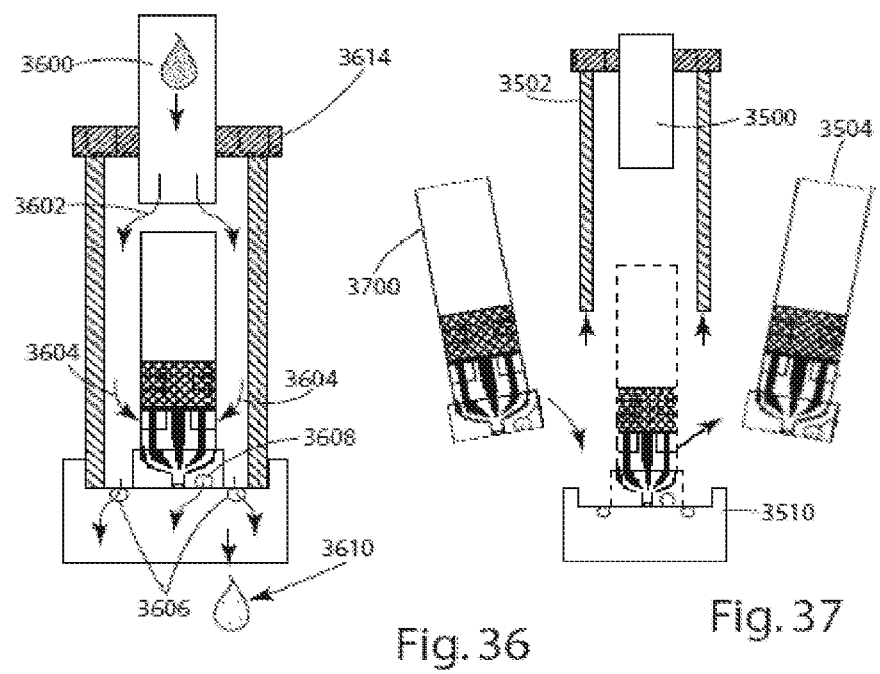
Fig. 36
Fig. 37

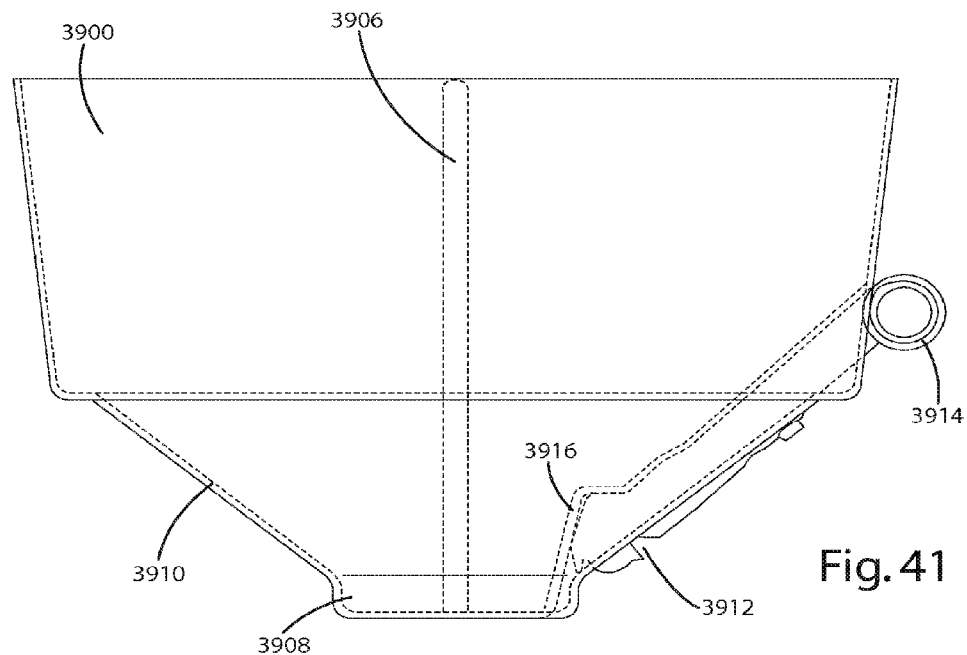
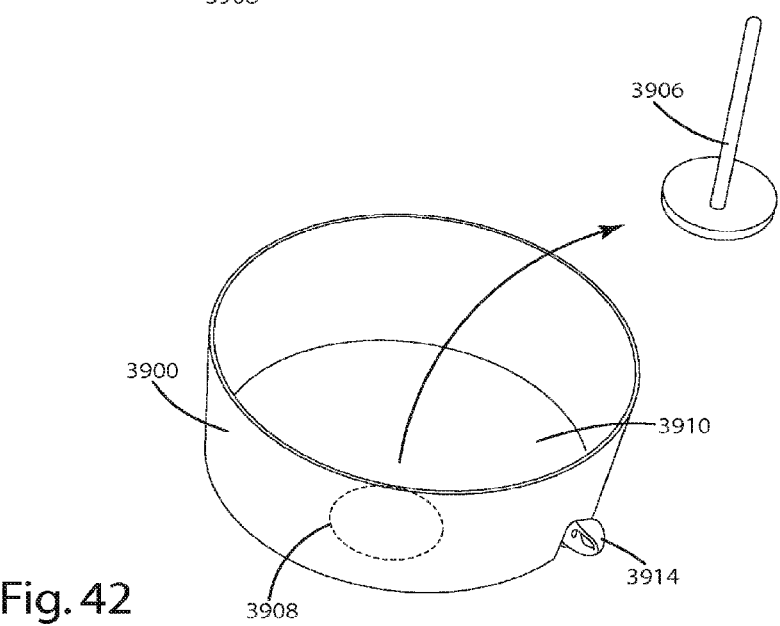
Fig. 41
Fig. 42

GRAVITY FEED WATER TREATMENT SYSTEM

The present disclosure relates to water treatment systems, and in particular, the disclosure relates to gravity feed water treatment systems.

BACKGROUND OF THE INVENTION

As the world's population increases, the demand for water also increases. Indeed, in some parts of the world where the local population is growing at a much higher rate than average, the availability of safe drinking water is lower than average. Some of this situation can be attributed to geography, whether from an arid climate or simply the lack of fresh surface water suitable for drinking. Additionally, many wellheads are running dry due to the lowering of underground aquifers, resulting in new wells being drilled to deeper depths, in an attempt to find water. In many cases, high costs prohibit these operations. Further, in many locales where water is very scarce, the population is unable to purchase water for consumption due to their low income levels and the fact that municipally treated water is unavailable. Examples of such settings may include rural villages in under-developed countries, emergency relief sites following natural disasters, or camp settings, to name a few.

Modern municipal water treatment systems, where available, are equipped to treat and distribute water for human consumption. In many cases, this treatment involves coagulation, flocculation and sedimentation of particulate matter. Additional filtering of the water may also be conducted, as well as treatment with chlorine. Due to the nature of a municipal system, the treated water may not be consumed immediately, and the chlorine remains in the water until it is dispensed.

When water is treated in a home beyond a municipal system (if one is available) the system is commonly referred to as a point-of-use (POU) system. These home POU systems use a variety of processes to treat water, such as: screening, reverse osmosis, carbon adsorption, deionization, softening, boiling, distillation and UV irradiation. Many POU systems are intended for homes with reliable access to supply water at relatively high pressure (>20 psi). Additionally, these homes generally have access to electricity or other energy sources to operate pumps to pressurize water and to run electronic devices generally found in some POU systems. Most of these systems require potable water to be supplied at the inlet.

As a result, there is a need for a home POU system for those who lack access to potable municipal water and who may not have access to electric power or other energy sources. People without a municipal water system seeking water may bring a container to a source, such as a well, stream, or lake, and obtain water directly. This water is either stored in containers or collected in a larger vessel for future use. If available, treatment is typically limited to simple pour-through screening or sand filtration. The bio-sand filters commonly used in residential and small village settings tend to be large and heavy. Some contain as much as 100 pounds of sand and gravel. These bio-sand filters are marginally effective at trapping microbes and particles and they typically produce water that is visibly clearer and relatively free of disease causing microbes. However, these systems tend to act as a chromatographic column meaning particles are trapped at various rates as the water moves down the column. The result is that eventually fine particles (thought to be trapped in the sand) begin to break through into the effluent water.

In some cases users allow the water to sit for a period of time, to allow for particles in the water to settle to the bottom of the container—sedimentation. In other cases, chemicals are added to the water to increase the speed of this process. These chemicals are sometimes called flocculation agents, such as alum or poly aluminum chloride. However, the water, even after this treatment, still needs to be disinfected, destroying microbes. Boiling may be the simplest treatment to destroy microbes or microorganisms, but requires an energy source. Another option is a bio-sand filtration unit. An exemplary bio-sand filtration unit (200) is shown in FIG. 2 and a flowchart illustrating a bio-sand filtration unit is shown in FIG. 1. These are less effective than boiling water, with the possibility of the resulting water still containing harmful microbes. Chlorine may be added to the water, for example, using the system shown in FIG. 3. But, the unfamiliarity of the taste chlorine adds to the water, combined with the unit volume required to achieve an effective treatment, leads many users to discontinue using the chlorinated water due to the offensive taste. As a result, these users often return to using untreated water, which perpetuates the cycle of illness and poor health.

In a publication entitled "Four Layer System" Dr. David H. Manz describes the effectiveness of bio-sand filters in terms of the maximum recommended face velocity of water through the exposed face area of the filter. He recommends that 600 liters per hour or flow per meter squared of exposed filter surface area as the maximum face flow rate per filter face area. This translates (through unit reduction) to a face velocity of 1 cm per minute.

$V$ max=maximum recommended face velocity $V$ max=600 l/hr/m^2=10 l/min/m^2

=10,000 cm^3/min/10,000 cm^2=1 cm/min

Moreover, Manz describes in great detail how the various deeper layers of his bio-sand filter could be adjusted in depth and particle size composition in order to control the face velocity at the top of the exposed sand layer. In effect, one of the primary reasons for the large mass of sand and gravel in the deeper layers is to establish and control back-pressure so that the face velocity through the sand bed is kept within the recommended range. In the Manz filter design (AKA, the HydrAid BioSand Water Filter) the exposed surface of the sand is circular and is approximately 12 inches (30.5 cm) in diameter. Using the Manz recommendation the maximum recommended flow rate through the system can be calculated.

Exposed Sand Area($A$)=Pi*$r$*$r$(Pi=3.14 $r$=radius)

A=3.14*15.25*15.25=730.25 cm^2
F max=maximum recommend flow rate
F max=A*V max
F max=730.25 cm^2*1 cm/min=730.25 cm^3/min=730.25 ml/min It can be seen from the calculation that the flow rate is fairly slow and may not be acceptable to users accustomed to faster flow rates when drawing water for cooking or drinking. Further, the system described by Manz requires a large mass of sand and gravel in order to achieve the desired flow rate.

What is needed then is a water treatment system that is easy to use, does not require electric power or other energy sources, can be used in conjunction with an existing water treatment system or alone, and is easy to maintain. It is desirable for the system to be useful in a variety of applications, such as treating water for consumption in the home, disaster relief and outdoor activities. A water treatment system that is smaller and more portable would also be desirable. In addition, an increased flow rate through the system would enhance ease of use and provide other benefits.

SUMMARY OF THE DISCLOSURE

In one embodiment of the present disclosure, a water treatment system having a flocculation (sometimes referred to as "coagulation" or "agglomeration") tank and an outlet located above the bottom of the tank is disclosed. The outlet may be a spigot or other user-operable valve. In use, untreated water is poured into the tank, along with a flocculation agent. After a period of time has elapsed and a sufficient percentage of the particles have come out of suspension in the water, the water is removed from the tank through a spigot located above the particle level, as shown in FIG. 4.

In another embodiment of the present disclosure, a water treatment system having a chlorination/dechlorination system is disclosed. Water is poured into an inlet funnel, where the water is exposed to chlorine, such as in soluble tablets, and enters the chlorination tank. Besides chlorine, other materials capable of disinfecting the water may be used, such as other halogens, including without limitation bromine and iodine. While the water is in the tank with chlorine in solution it is being disinfected. The water may pass through diffusers to help ensure even mixing of the chlorine solution. The water treatment system may include a carbon filter to remove the chlorine from the disinfected water. The water treatment system includes an outlet, such as a spigot, though which the disinfected water exits the tank through a spigot, as shown in FIGS. 6 and 7.

In a third embodiment of the disclosure, a water treatment system having a flocculation and chlorination/dechlorination system is disclosed. The chlorination/dechlorination system may include a chlorination tank for adding chlorine to the water and a filter, such as a carbon filter, for removing chlorine from the water. In use, untreated water is poured into the flocculation tank, along with a flocculation agent. After a period of time has elapsed and the particles have come out of suspension in the water, it exits the flocculation tank through an outlet (e.g. a spigot) and is directed into the chlorination tank inlet funnel, where the water is exposed to chlorine, such as in soluble tablets, and enters the chlorination tank. While the water is in the tank with chlorine in solution it is being disinfected. The water may pass through diffusers to help ensure even mixing of the chlorine solution and a carbon filter to remove a sufficient amount of the chlorine. The dechlorinated water may exit the tank through an outlet (e.g. a spigot), as shown in FIG. 14.

In another embodiment of the disclosure, a water treatment system having a flocculation, a bio-sand filter, and chlorination/dechlorination system is disclosed. In use, untreated water is poured into the flocculation tank, along with a flocculation agent. After a period of time has elapsed and the particles have come out of suspension in the water, it is directed into the bio-sand filter tank, where particles are trapped in the various sand layers as the water passes through them. Upon exiting the bio-sand filter tank, the water enters the chlorination tank inlet funnel, where the water is exposed to chlorine, such as in soluble tablets, and enters the chlorination tank. While the water is in the tank with chlorine in solution it is being disinfected. The water may pass through diffusers to help ensure even mixing of the chlorine solution and a carbon filter to remove the chlorine and exits the tank, for example, through a spigot, as shown in FIG. 15. In this embodiment the bio-sand filter may be any commercially existing bio-sand filtration system.

In another embodiment of the disclosure a water treatment system includes an improved filter. The improved filter provides a desired flow-rate through the system. The described water treatment system embodiments are smaller and more portable than water treatment systems including a traditional filter. In one embodiment, the filter is a sand bed filter including a non-woven filter media set above the holes in the bottom of a bucket but below the bed of sand. In another embodiment, the filter is a pressed block filter. The pressed block filter is constructed of a filter media, such as sand or activated carbon, and a polymer binder. In some embodiments, the improved filter may be used in a POU gravity feed water treatment system that removes contaminants from water by a flocculation and coagulation step prior to treatment. It may also be used alone or in conjunction with a post treatment to chlorinate and optionally dechlorinate the treated water.

In another embodiment of the disclosure a water treatment system includes a siphon for ensuring appropriate dosing of flocculation chemical into the water. A predetermined quantity of flocculation chemical is prescribed for the user to add to the water. If the water level is not correct, then an improper dose of flocculation chemical may result. A siphon ensures that water does not begin to flow unless and until the water level reaches a predetermined threshold. If the user does not add enough water then the flocculation dosing is incorrect and the water will not flow.

In another embodiment of the disclosure a water treatment system includes a chlorinator device attached outside of the bucket instead of being attached to the lid of the bucket. A user can access the chlorinator device without otherwise disturbing the water treatment system or having to touch the water in the system. Portions of the chlorinator device may be see-through allowing a user to see how much of the chlorine tablet is left without opening or accessing the chlorinator device.

In another embodiment of the disclosure a water treatment system includes a manual pump that assists in allowing the system to operate without electricity or a source of pressurized water. Prior to exiting the system for consumption, water flows through a filter that removes contaminants from the water. The pump creates negative pressure on the effluent side of the filter, compared to the influent side, which allows the user to draw water at a much higher flow rate than gravity flow through the filter. One benefit of the pump is that it enables filters that require higher flow rates and/or pressures to be used.

In yet another embodiment of the disclosure a water treatment system includes a flocculant funnel and ladle. Flocculation chemicals may be added to the system and stirred with the ladle. While flocculation is occurring, the ladle may be stored in the tank and collect particles. When flocculation is complete the outlet valve may be actuated to drain water from above the sediment in the ladle. The water may be drained into another water treatment system.

BRIEF DESCRIPTION OF THE DRAWINGS

The disclosure may be better understood with reference to the drawings and following description. Non-limiting and non-exhaustive embodiments are described with reference to the following drawings. The components in the drawings are not necessarily to scale, emphasis instead being placed upon illustrating the principles of the invention. In the drawings, like referenced numerals designate corresponding or similar parts throughout the different views.

FIG. 35 illustrates one embodiment of a chlorine metering device;

FIG. 36 illustrates a water flow path through the chlorine metering device in FIG. 35;

FIG. 37 illustrates one embodiment of replacement of a chlorine capsule;

FIG. 41 illustrates a side view of the flocculant funnel described in FIG. 40;

FIG. 42 illustrates a perspective view of the flocculant funnel described in FIG. 40 with a ladle removed;

DETAILED DESCRIPTION OF THE DISCLOSURE

The POU water treatment system of the present disclosure is configurable to a variety of situations. The various components can be used singly or in various combinations to treat water for consumption or other uses. It is important to note that the configurations detailed below are exemplary and not exhaustive.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The disclosed subject matter is to be considered illustrative, and not restrictive. It will be apparent to those of ordinary skill in the art that many other embodiments and implementations are possible within the scope of the invention.

I. Flocculation

Figure 1:
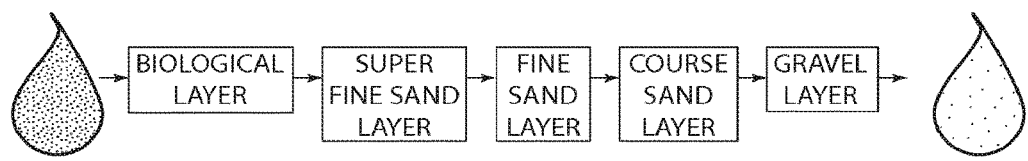
FIG. 1 is a flowchart describing a traditional gravity-feed sand filtration process.
Figure 2:
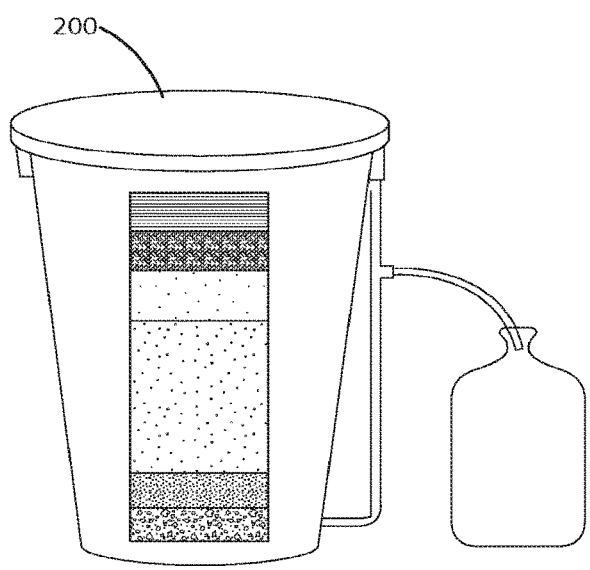
FIG. 2 is an illustration of a traditional bio-sand filter with biological layer and multiple sand and gravel layers.
Figure 3:
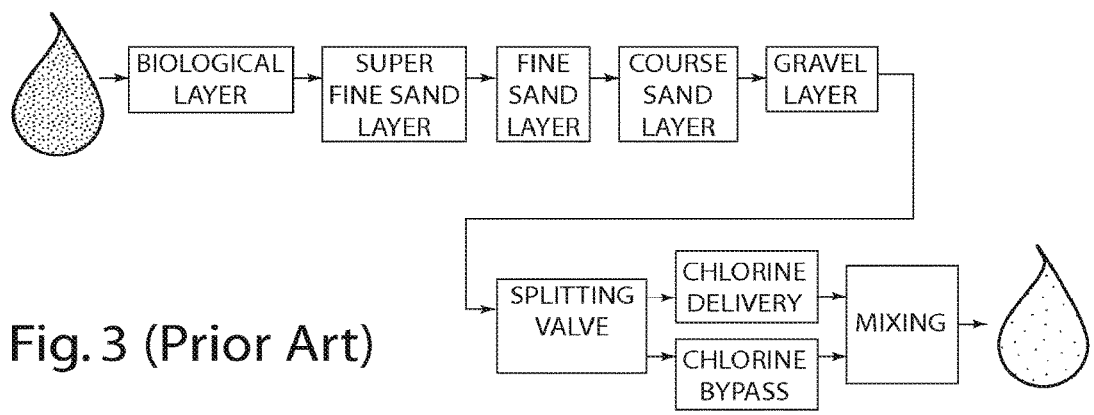
FIG. 3 is a flowchart describing a traditional bio-sand filtration process with optional chlorine dosing.
Figure 4:
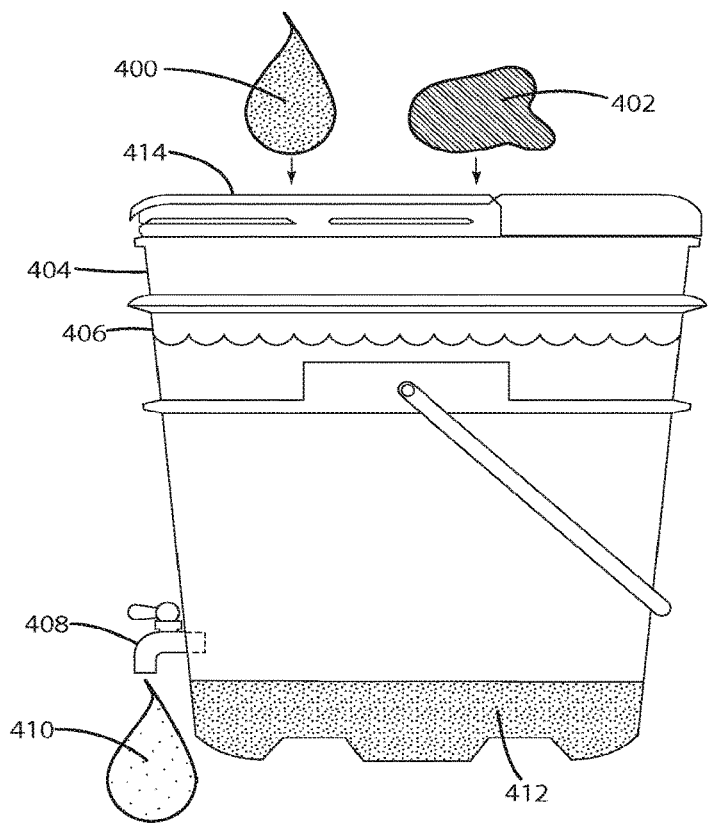
FIG. 4 illustrates a flocculation tank and process according to at least one embodiment.

FIG. 4 illustrates a flocculant (sometimes referred to as "coagulant" or "agglomerant") treatment system according to one embodiment of the present disclosure. The water treatment system generally includes a tank (404) having an inlet (414), and an outlet (408). The tank (404) of the illustrated embodiment is a bucket, such as a generally conventional plastic 5-gallon bucket. The bucket (404) may alternatively be essentially any other containers or reservoirs capable of storing the water and flocculant. In the illustrated embodiment, the outlet (408) may be a conventional spigot or any other valve capable of selectively allowing water to be drawn from the tank (404). The outlet (408) (e.g. the spigot) is mounted in the wall of the tank (404) at a level where it will be above the expected depth of the sediment that accumulates during the settling period. Untreated water (400) is added, along with a flocculant (402) to a container or tank (404). The solution of water and flocculant combined (406) is mixed and allowed to stand in the tank (404) for a period of time, such as several hours. After the visible particulates have settled into the bottom of the tank (404), a spigot or valve (408) is opened, allowing the treated water (410) to exit the tank, leaving the coagulated particles (412) at the bottom of the tank, where they may be removed by the user through washing and rinsing.

According to one embodiment, the POU gravity feed water treatment system removes contaminants from water by flocculation. Flocculation involves using a chemical agent of some sort (a flocculant) to encourage particles suspended in water to come out of solution by joining together (coagulating) and settling to the bottom of a tank or container due to their increased weight caused by the addition of the flocculant. In some cases, particles suspended in water will settle to the bottom of a container, but this may take prolonged periods of time. Other particles may remain in the solution and never settle to the bottom.

In practice in rural or undeveloped areas, water is often gathered in a container or tank from a water source, such as a lake, river, or well. A flocculant is added in small doses; for example, a teaspoon for a 5 gallon container of water to be treated. The flocculant may consist of a variety of chemicals, such as alum, aluminum chlorohydrate, aluminum sulfate, calcium oxide, calcium hydroxide, iron chloride, iron sulfate, polyacrylamide, poly aluminum chloride, sodium aluminate, or sodium silicate. Additional or alternative natural flocculants may also be used, such as chitosan, moringa olifera seeds, papain, or isinglass. After the dose of flocculant is added, it may be stirred for improved results, to distribute the chemical evenly about the container. Stirring may be accomplished using a conventional electromechanical stirring device, magnetic stirring device, a mechanical stirring device such as a spoon, or other stirring methods or stirring devices.

The next step involves allowing the treated water to sit in its container for a period of time. In the case of a 5 gallon container, it may be desirable for the treated water to sit as much as 12-24 hours for the particles to coagulate and settle to the bottom of the container, although with various combinations of chemical and water conditions the time could be much shorter. As this process can be somewhat time-consuming, it may be desirable to have more than one container involved and at different stages of treatment time to produce a steady supply of flocculant-treated water. The flocculant-enriched water is then allowed to sit for a period of time, such as several hours or until the visible particulate matter has settled to the bottom of the container. It is important to note that microbes or microorganisms and some particulates and other water contaminants may remain present in the flocculant-treated water.

After the water has cleared sufficiently, it can be removed from the container by a spigot or valve integral with the container (preferably at a point of depth above the expected sediment level).

II. Chlorination/Dechlorination

Figure 5:
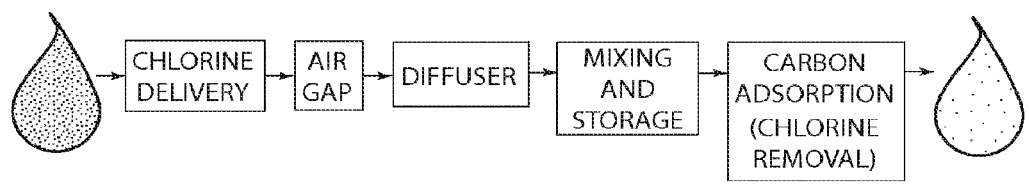
FIG. 5 is a graphical representation of a chlorination process according to at least one embodiment.

According to at least one embodiment, the POU gravity feed water treatment system uses a chlorination/dechlorination process to disinfect water by using chlorine to deactivate microorganisms which may reside in the water. Chlorine for water treatment can be obtained from a variety of sources, such as tri-chlorinated isocyanuric acid tablets commonly used in swimming pool applications, calcium hypochlorite, or di-chlorinated isocyanuric acid. Water to be treated is poured into a tank or container, where chlorine is added in measured doses. A filter is used to remove the chlorine from the water, so that the dispensed treated water does not have a chlorine taste, which may be undesirable to consumers. After water has passed through the chlorination/dechlorination process, it is ready for consumption. A flowchart is provided in FIG. 5.

Tri-chlorinated isocyanuric acid (CAS #87-90-1) is a stable vehicle for chlorine delivery to water. It provides a higher chlorine density (90% available chlorine) compared to the other types of chlorine mentioned due to the triple chlorination of the molecule. It is NSF approved for drinking water and is readily available. The use of tri-chlorinated isocyanuric acid tablets provides an additional benefit for treating water in that it enables the removal of arsenic from the water. Naturally occurring arsenic in water is normally in the +3 oxidation state. The isocyanuric acid from the chlorine tables oxidizes arsenic in the water from the +3 state to the +5 state. When arsenic is in the +5 state the carbon block filter will remove it from the water.

According to one embodiment, the POU gravity feed water treatment system uses a halogenation/dehalogenation process to disinfect water by using a halogen chemical to deactivate microorganisms which may reside in the water. Halogen chemicals can be obtained from a variety of sources, such as bromine and iodine. Water to be treated is poured into a tank or container, where halogen chemical is added in measured doses. A filter is used to remove the halogen chemical from the water, so that the dispensed treated water does not have a chemical taste, which may be undesirable to consumers. After water has passed through the halogenation/dehalogenation process, it is ready for consumption.

Figure 6:
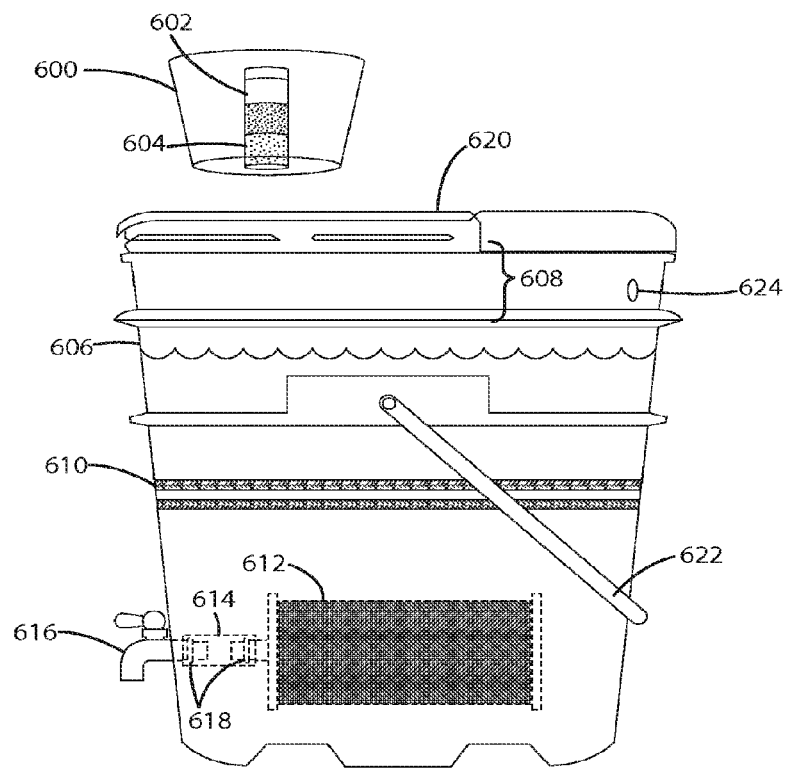
FIG. 6 illustrates a chlorination/dechlorination tank and process according to at least one embodiment.
Figure 7:
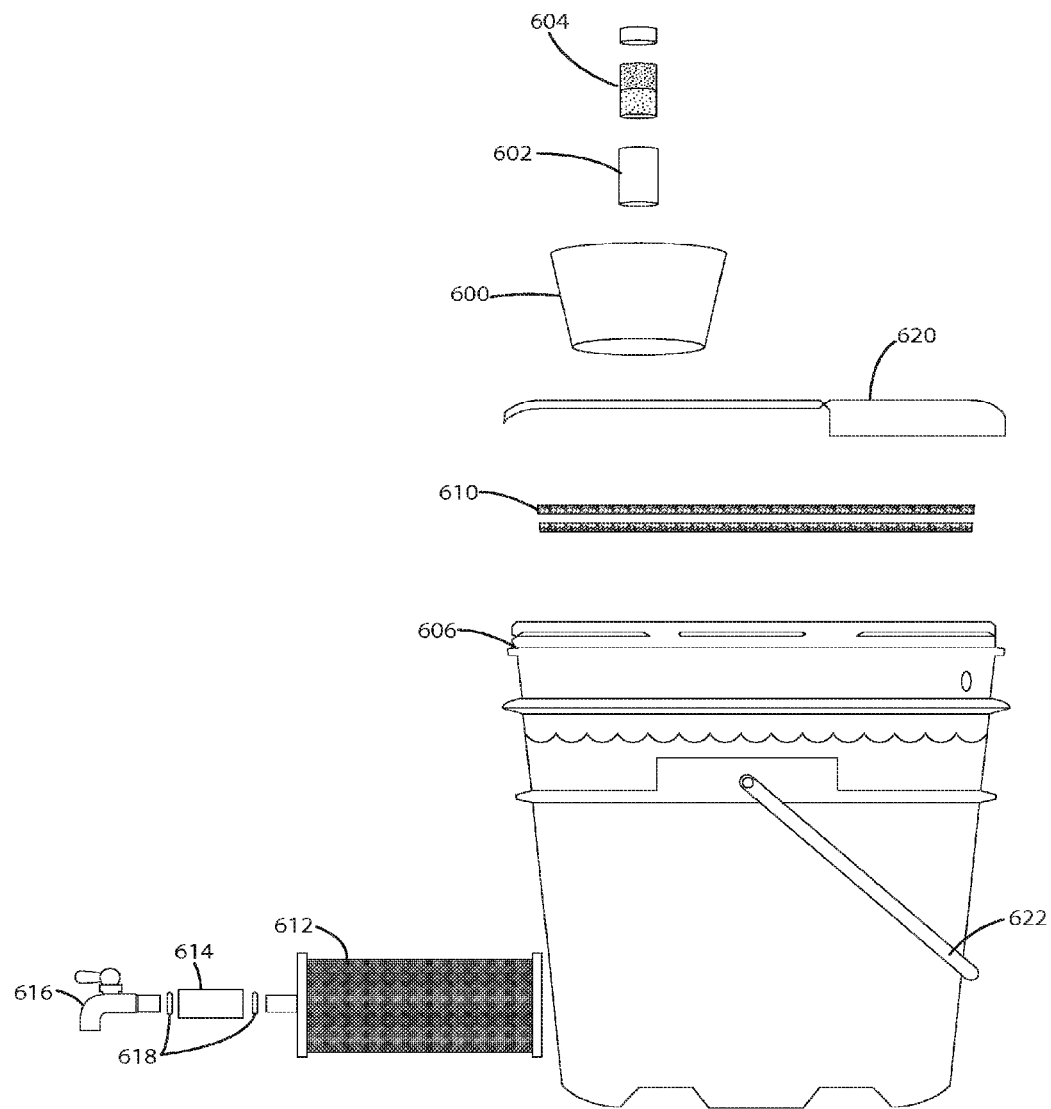
FIG. 7 is an exploded view illustration of a chlorination/dechlorination tank and process according to at least one embodiment.

FIGS. 6 and 7 illustrate the chlorination/dechlorination treatment according to one embodiment of the present disclosure. The chlorination/dechlorination system generally includes a tank (606), a chlorination unit (600, 602 and 604), a diffuser (610), a dechlorination unit (612) and an outlet (616). The tank (606) of the illustrated embodiment is a bucket, such as a generally conventional plastic 5-gallon bucket. The bucket (606) may alternatively be essentially any other containers or reservoirs capable of storing the water. The illustrated bucket (606) includes a handle (622) and a hinged lid (620). The bucket (606) may also define an overflow drain hole (624). The overflow drain hole (624) may include a bug screen (not shown). In the illustrated embodiment, the chlorination unit includes a water inlet funnel (600), a chlorination capsule (602) and one or more chlorine tablets (604). In the illustrated embodiment, the system includes optional diffusers (610) that assist in mixing the chemical. The system may include a plurality of layers of diffusers (610). In the embodiment of FIGS. 6 and 7, the dechlorination unit may include a carbon filter, such as a pressed carbon block filter. The carbon block filter may be replaced by other filters capable of sufficiently dechlorinating the water. In the illustrated embodiment, the outlet (616) may be a conventional spigot or any other valve capable of selectively allowing water to be drawn from the tank (606). The outlet (616) (e.g. the spigot) is mounted in the wall of the tank (606) and is coupled to the discharge of the dechlorinating unit (612), for example, by bushing (614) and O-rings (618). Water to be treated, or water that has undergone treatment previously, such as flocculation or bio-sand filtration, is poured into water inlet funnel (600), which contains chlorine capsule (602), containing at least one chlorine tablet (604). Water is thus exposed to the chlorine in the tablets and chlorine is dissolved into the water, for example 2-4 ppm (parts per million). The process is further detailed in FIG. 10. It may be desirable to use water which has had some sort of particulate removal, such as flocculant or bio-sand filter treatment for best results. This will prolong the life of the chlorine removal carbon filter by reducing clogging.

The chlorinated water then enters the chlorination tank (606), which may contain an air gap (608) for maintaining an acceptable level of chlorine and isocyanuric acid concentration in the water and may optionally also contain diffusers (610) which improve the mixing of the chlorinated water to a uniform solution. Also residing in the tank (606) is an activated carbon pressed block filter (612) for removing the chlorine dissolved in the water present in the tank. The filter may be the eSpring carbon block filter available from Amway Corp. of Ada, Mich. Bushing (614) connects the filter to a spigot or valve (616) and is sealably connected to the filter and spigot by o-rings (618). The container or tank (606) may include a hinged or otherwise selectively closable lid (620), as well as an optional carrying handle (622). The tank may also include a drain hole (624) for overflow purposes that includes a barrier to prevent foreign objects from entering the tank. An exploded view of the chlorination/dechlorination tank is shown in FIG. 7.

Figure 8:
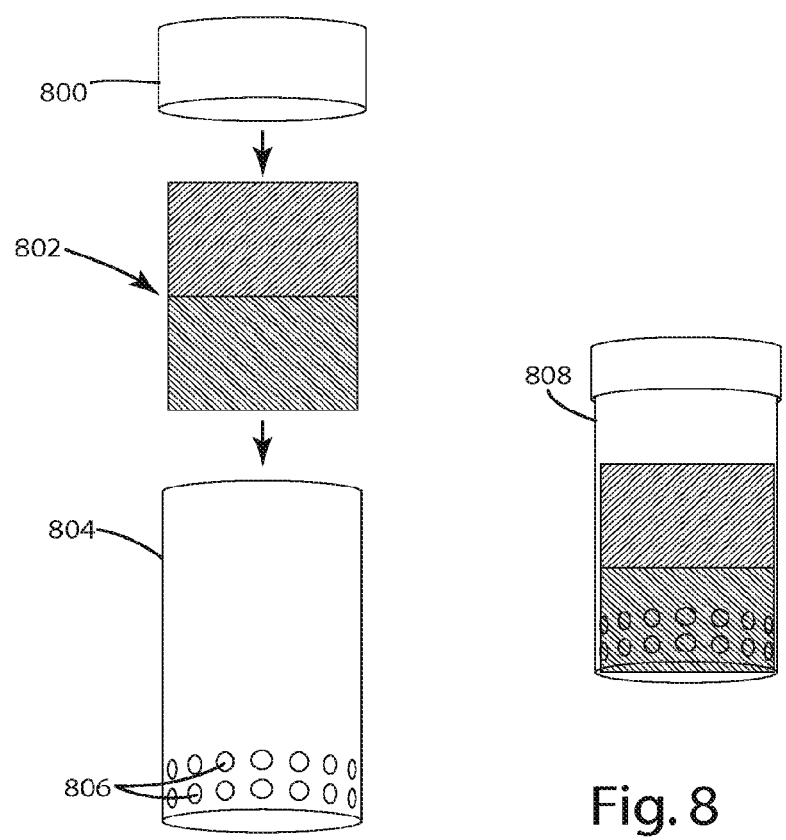
FIG. 8 is an illustration of a chlorine capsule according to at least one embodiment.

FIG. 8 is a close-up illustration of the chlorination dosing device, which includes a cover (800) which prevents chlorine tablets (802) from departing capsule (804). The capsule further includes a plurality of holes (806) at the bottom portion of the capsule to allow for the untreated water to come into contact with the chlorine tablets (802), resulting in some chlorine dissolving into the water solution. Water would then flow into the tank and be optionally filtered before being dispensed for use (not shown). One embodiment of the dosing device includes two chlorine tablets, which will be fully dissolved after treating approximately 2000 gallons of water or more. Other optional designs may require higher dosing of water with high chlorine demand. In other embodiments, various sizes and numbers of chlorine tablets will yield different volumes of treated water. The cover (800) may be threadably secured to the capsule (804) allowing for a user to replace chlorine tablets after they have been consumed by water treatment. Optionally, a sealed cover/capsule combination (808) may be provided that prevents a user from interacting with chlorine directly. For example, the cover (800) may be sonic-welded or one-way threaded to the capsule (804). Further optionally, the entire capsule/cover with tablets sealed within may be provided as a disposable assembly. Another benefit of the sealed capsule design is that it facilitates safe handling and compliance with shipping regulations of tri-chlorinated isocyanuric acid tablets. Tri-chlorinated isocyanuric acid can present a fire hazard when shipped in bulk quantities. As such, special shipping practices and regulations may come into effect when bulk shipping it. By packaging small quantities in individually sealed capsules, the hazard is greatly reduced and the need for special shipping procedures and regulations is eliminated.

Figure 9:
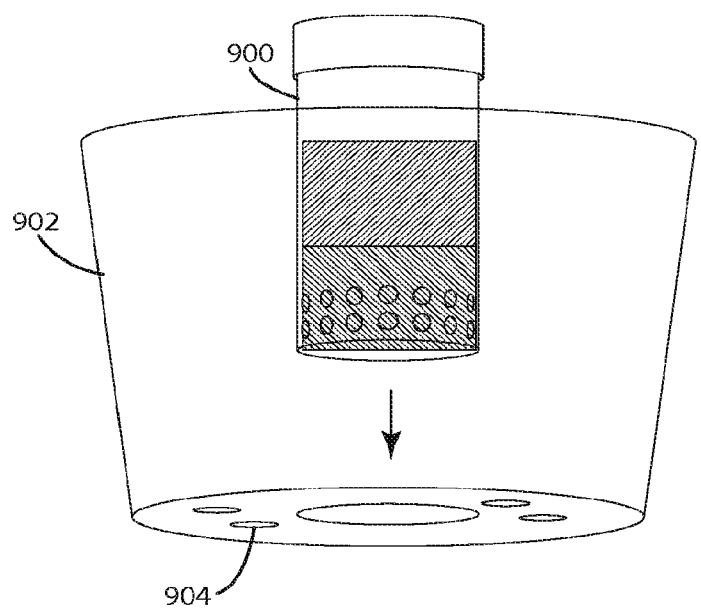
FIG. 9 is an illustration of a water inlet funnel with chlorine capsule according to at least one embodiment.
Figure 10:
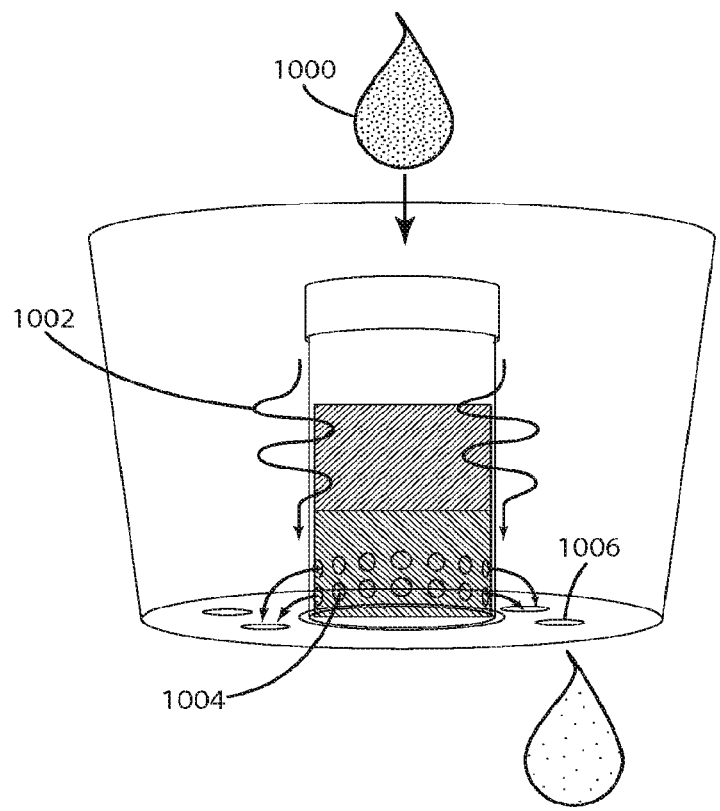
FIG. 10 is an illustration of a water inlet funnel with chlorine capsule according to at least one embodiment.

Another embodiment of the capsule and water inlet funnel is shown in FIG. 9. Chlorine dosing device (900) is shown aligned with an attachment point within water inlet funnel (902). In this embodiment, the dosing device securely connects to the funnel such that the capsule outlet holes are adjacent to the bottom surface of the funnel. This placement enhances the likelihood that untreated water will be fully exposed to the chlorine tablets to receive an appropriate dosage before exiting the funnel via outlet holes (904) and being deposited in the chlorination tank (not shown). It is desirable to design the outlet holes in the capsule for the flow rate that the system is designed for to allow the chlorine to be dissolved into the water at levels which are effective in destroying microbes. If the untreated water is insufficiently exposed, the water within the tank will have too low of a percentage of dissolved chlorine to effectively rid the water of microbes. Conversely, if the water is exposed to too much chlorine, the microbes will be dealt with but the dechlorination filter (if equipped) life will be reduced, and if no filter is used, the high levels of chlorine may result in treated water that has an unsatisfactory taste. For example, the outlet holes (904) may be arranged so as to keep pace with the outlet flow from a flocculation or bio-sand filter tank. Such a flow rate could be between 300 and 900 ml/min. FIG. 10 details the chlorination process. Untreated water (1000) enters the funnel through the opening in the top. The water may be fed into the funnel through a bio-sand filter, with a bucket or pitcher, or any other suitable device for feeding water into the funnel. Water flows around the chlorine capsule (1002), but does not flow through the capsule. The diffusion holes allow controlled amounts of chlorine to enter the water stream as the water flows around the capsule (1004). The number and size of the holes is designed to achieve a desired chlorine level. The holes in the bottom of the funnel provide enough flow restriction to allow the water level to rise up and surround the capsule (1006). At the same time, they allow enough water to flow out to keep up with the flow rate of an upstream system such as the HydrAid™ Safe Water System of International Aid, Inc. of Spring Lake, Mich. (now Safe Water Team).

Figure 11:
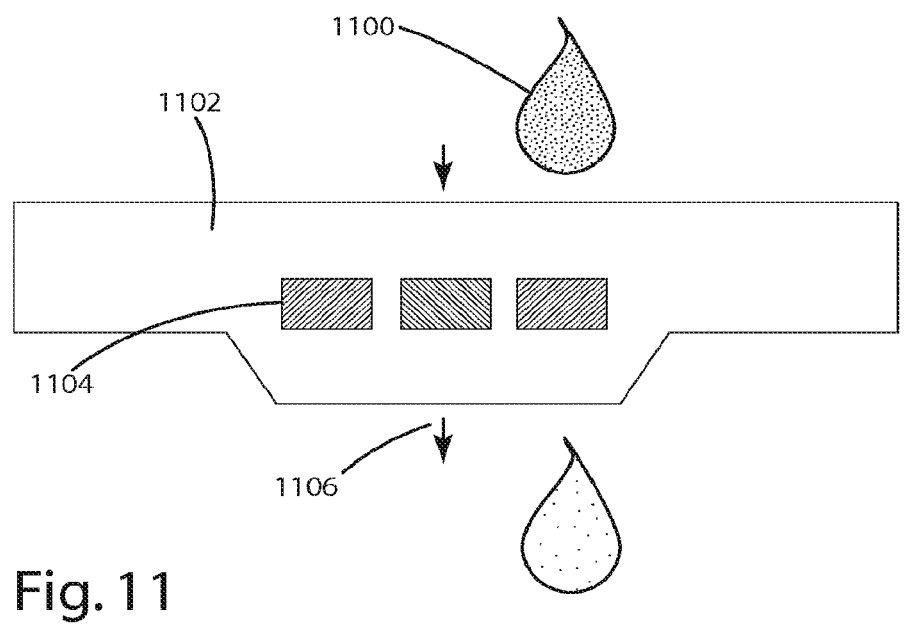
FIG. 11 is an illustration of a water inlet funnel with chlorine capsule according to at least one embodiment.

Another embodiment of the water inlet funnel is shown in FIG. 11, for use in higher volume water treatment applications. Untreated water (1100) enters the funnel (1102), which features a larger opening to accommodate a higher flow rate of incoming water, such as 5 gpm or more. Multiple chlorine tablets (1104) are shown in the lower portion of the funnel, which expose more chlorine for more rapid absorption by the flowing water. The number of tablets may be varied according to local water conditions and dosing requirements. Chlorinated water (1106) then exits the funnel and is stored in the chlorination/dechlorination tank (not shown).

Figure 12:
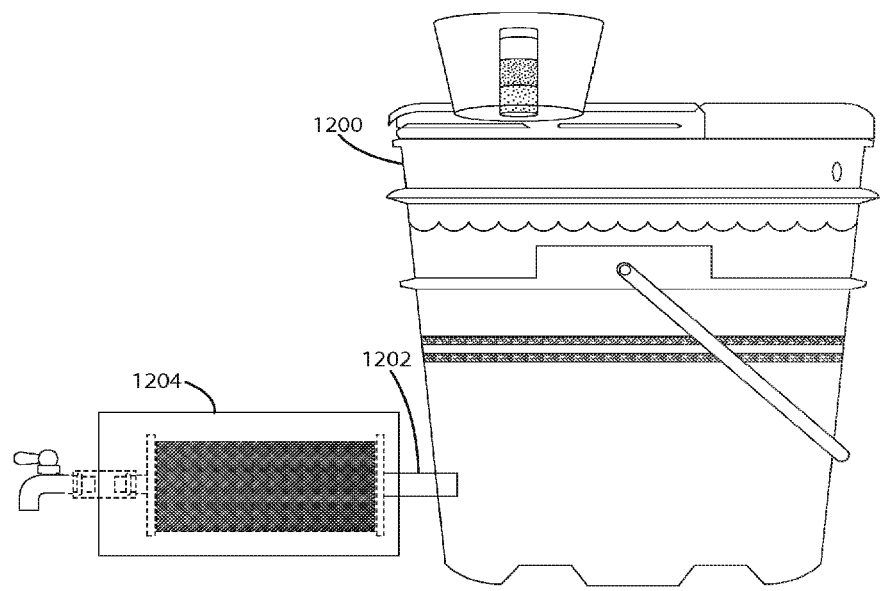
FIG. 12 is an illustration of a chlorination/dechlorination tank and process according to at least one embodiment.

Another embodiment of the chlorination/dechlorination tank of the present disclosure is shown in FIG. 12. The tank (1200) is shown, complete with chlorine dosing device and optional diffusers. At the bottom portion of the tank a conduit (1202) is shown, which is connected to filter vessel (1204), located outside of the tank (1200). The conduit may be of a solid or flexible type, such as plastic pipe or hose, and is sealably connected to both the tank and the filter vessel. The filter vessel (1204) also contains filter media, such as of a carbon block type, for removing chlorine prior to dispensing through a spigot or other valve, also sealably connected to the filter vessel. An additional pre-filter may be added around the filter media, which may be replaced periodically to retain particulates that may not have been removed in a previous flocculation treatment.

III. Flocculation & Chlorination/Dechlorination

Figure 13:
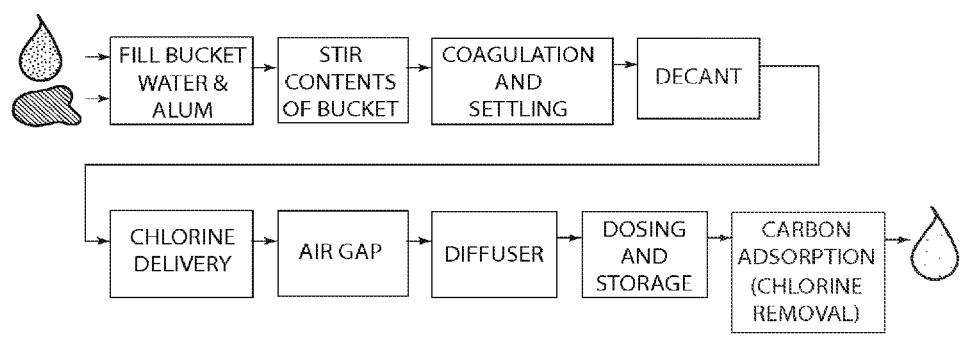
FIG. 13 is a graphical illustration of the flocculation and chlorination/dechlorination process according to at least one embodiment.

According to one embodiment, the POU gravity feed water treatment system removes contaminants from water by combining the coagulation and/or flocculation and chlorination/dechlorination processes to enable users to remove particulate matter from water as well as deactivate microorganisms. A flowchart of the process is shown in FIG. 13.

As disclosed above, in rural or undeveloped areas, water may be gathered in a container or tank from a water source such as a lake, river, or well. A flocculant is added in small doses; for example, a teaspoon for a 5 gallon container of water to be treated or via a dosing meter. After the dose of flocculant is added, it should be stirred for best results, to distribute the chemical evenly about the container. In certain situations, additional chemicals may be added such as aluminum sulfate, ferric sulfate or ferric chloride, depending on local water conditions.

In the next step, the treated water is allowed to sit in its container for a period of time. In the case of a 5 gallon container, between 12-24 hours is desirable for the particles to coagulate and settle to the bottom of the container. As this process is somewhat time-consuming, it may be desirable to have more than one container involved and at different stages of treatment time to produce a steady supply of flocculant-treated water. After the water has cleared sufficiently, it can be removed from the container by pouring, or by a spigot or valve integral with the container (preferably at a point of depth above the expected sediment level).

The visibly clearer water is then poured or directed from the flocculation tank into the chlorination/dechlorination tank, where chlorine is added. In one embodiment, the water flow rate from the flocculation tank is approximately 900 ml/min and the water will be chlorinated to a level of between 2 to 5 ppm. The air gap in the chlorination tank reduces the possibility of over-chlorination of the water and the optional diffuser aids in mixing the water to facilitate even chlorination as the water enters the tank and when it is also extracted from the bottom-mounted spigot. For a 5 gallon chlorination tank with an inflow rate of 900 ml/min the chlorine dose is sufficient to kill more than 99.99% of the bacteria and more than 99.9% of the viruses present in the water.

A filter is used to remove the chlorine from the water, so that the dispensed treated water does not have an unacceptable level of chlorine taste, which may be undesirable to consumers. After water has passed through the chlorination/dechlorination process at a rate of approximately 0.2 to 0.5 gpm (gallons per minute) it is ready for consumption.

Figure 14:
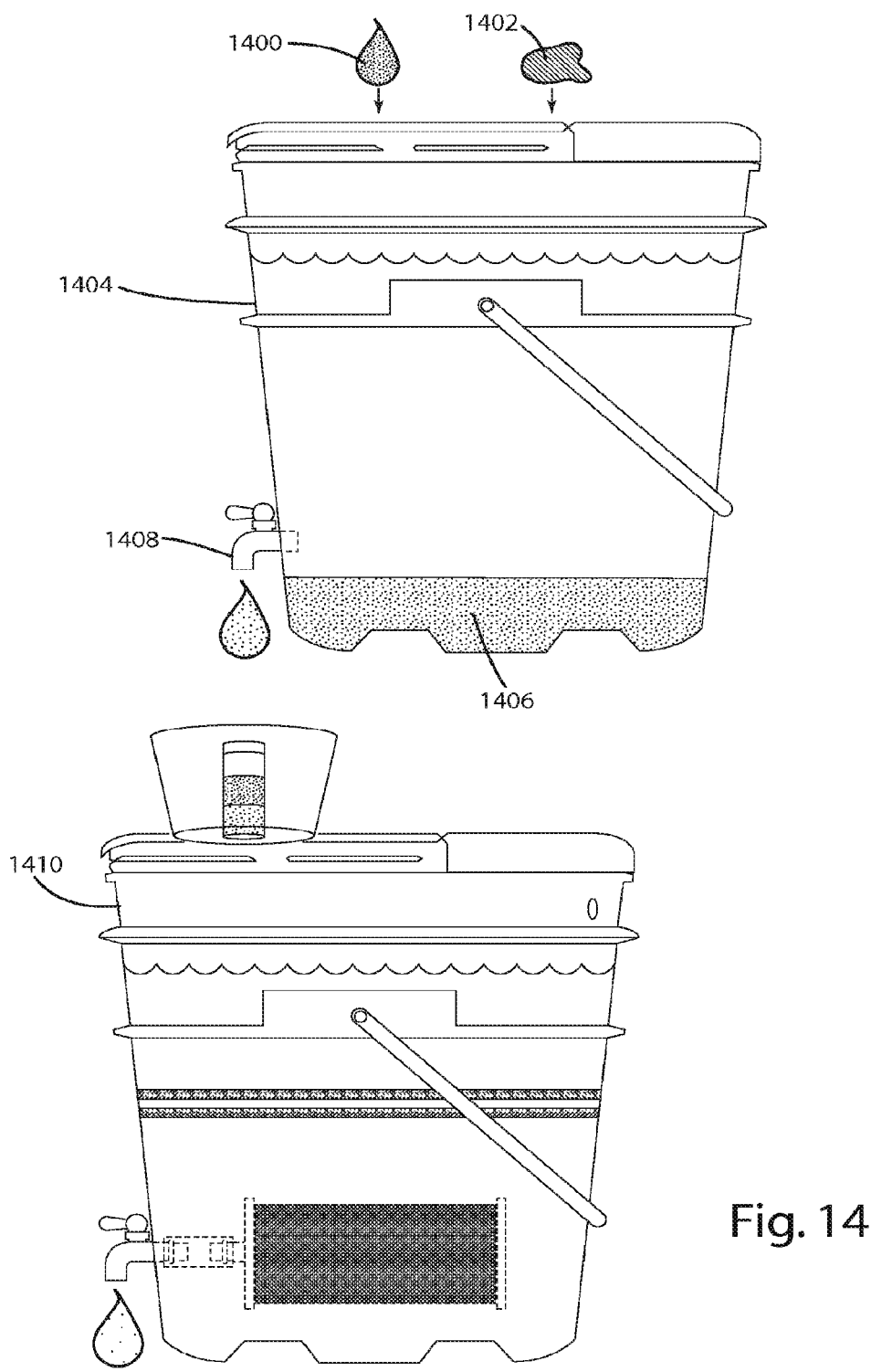
FIG. 14 is an illustration of a flocculation tank and process combined with a chlorination/dechlorination tank and process according to at least one embodiment.

As shown in FIG. 14, a flocculation tank is combined with a chlorination/dechlorination tank to provide a system for removing particles and microbes from untreated water. Untreated water (1400) and flocculant (1402) are added to flocculation tank (1404). The water and flocculant are mixed and allowed to settle for a period of time. After the water has clarified, it is removed from the tank (1404) through spigot (1408), which is set above the depth of the settled particles (1406). The water proceeds into chlorination tank (1410) via the water inlet funnel as disclosed above. The chlorinated water accumulates in the chlorination tank before chlorine is removed via the filter. Dechlorinated water is removed via a spigot at the bottom portion of the tank, and is ready for consumption.

IV. Flocculation+Existing Bio-Sand Filter+Chlorination/Dechlorination

According to one embodiment, the POU gravity feed water treatment system removes contaminants from water by adding a bio-sand filtering process to the flocculation and chlorination/dechlorination processes to enable users to remove particulate matter from water, deactivate microorganisms and remove additional particulates and microbes or microorganisms.

As disclosed above, in rural or undeveloped areas, water may be gathered in a container or tank from a water source such as a lake, river, or well. A flocculant is added in small doses; for example, a teaspoon for a 5 gallon container of water to be treated. After the dose of flocculant is added, it may be stirred to provide improved results, to distribute the chemical evenly about the container.

The next step involves allowing the treated water to sit in its container for a period of time. In the case of a 5 gallon container, between 12-24 hours may be desirable for the particles to coagulate and settle to the bottom of the container. As this process is somewhat time-consuming, it may be desirable to have more than one container involved and at different stages of treatment time to produce a steady supply of flocculant-treated water. After the water has cleared sufficiently, it can be removed from the container by pouring, or by a spigot or valve integral with the container (preferably at a point of depth above the expected sediment level).

Flocculant-treated water is then poured into a bio-sand filter, which generally features a number of layers of sand and gravel of various diameters which trap particles and microbes. The top two inches of these sand filters is commonly referred to as the microbes or microorganisms layer or "bio-sand" layer. It is in this layer that trapped microbes tend to consume organic material in the water. Bio-sand filters are, due to the layers of sand and gravel required to be effective, generally large and bulky devices, and typically require regular maintenance to be effective. Additionally, bio-sand filters are not particularly effective at trapping microbes, such that some microbes may not be trapped in the bio-sand filter and could be consumed by users, if not for after-treatment chlorination.

Water enters the bio-sand filter and passes through a number of sand and gravel layers. Water is then poured or directed from the bio-sand filter tank into the chlorination/dechlorination tank, where chlorine is added in measured doses. A filter is used to remove the chlorine from the water, so that the dispensed treated water does not have a chlorine taste, which may be undesirable to consumers. After water has passed through the chlorination/dechlorination process, it is ready for consumption.

Figure 15:
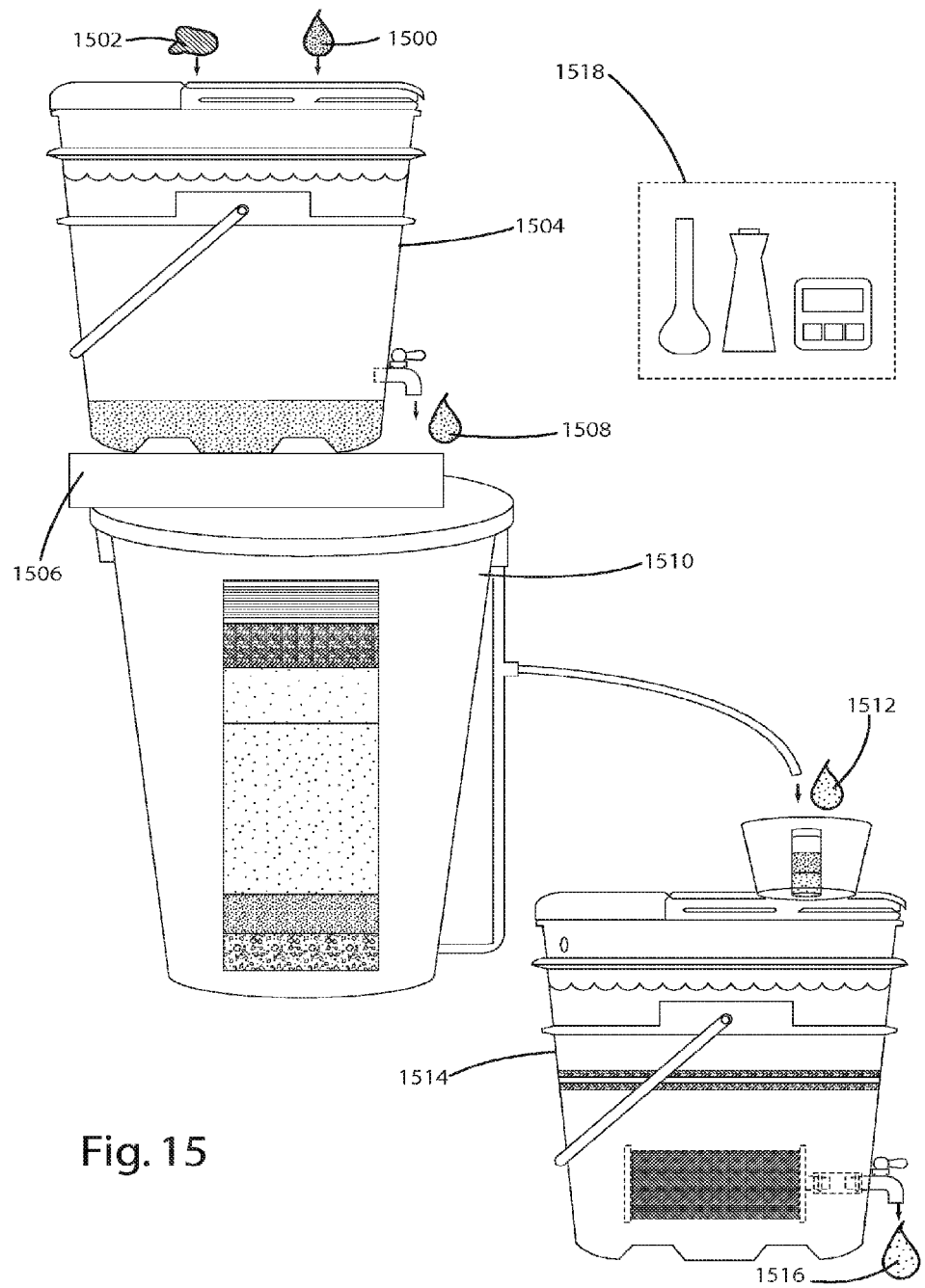
FIG. 15 is an illustration of a flocculation tank, a bio-sand filter tank, and a chlorination/dechlorination tank according to at least one embodiment.

In one embodiment, the gravity feed water treatment system of the present disclosure is used in conjunction with an existing bio-sand filter water treatment system, to provide for treated water that will generally be cleaner and safer than if it were solely treated by a bio-sand filter type system. This embodiment is shown in FIG. 15.

Untreated water (1500) is combined with flocculant (1502) in a flocculation tank (1504). A support dolly (1506) provides a secure platform for the tank (1504) to rest. The support dolly may optionally include hanging hooks, slots, or pockets specifically designed for storage or accessories. Flocculant-treated water (1508) exits the tank and is routed by the dolly into bio-sand filter tank (1510), such as the HydrAid™ Safe Water System of International Aid, Inc. of Spring Lake, Mich. Water is treated by the HydrAid™ system and additional particles and some microbes are removed. The bio-sand filtered water (1512) then exits the HydrAid™ system and enters the chlorination/dechlorination tank (1514) where the water is exposed to chlorine and the chlorine is removed by filter prior to dispensing for use. Additional accessories (1518) may be provided, which may include a measuring spoon for chemical dosing, a chemical dosing device for providing accurate and repeatable doses of chemicals, and a timer.

V. Bio-Sand Filter and Chlorination/Dechlorination

Figure 16:
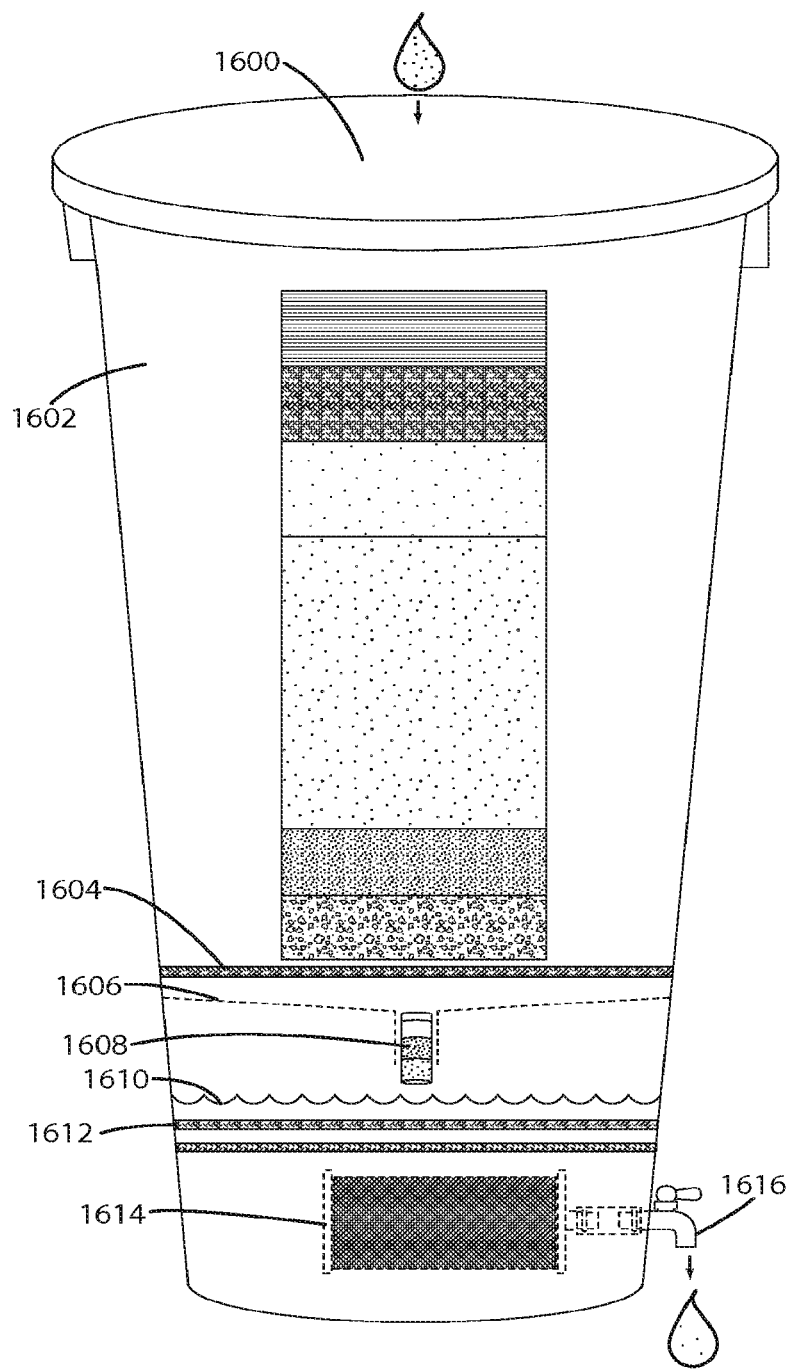
FIG. 16 is an illustration of a combined bio-sand filter and chlorination/dechlorination tank and process according to at least one embodiment.

According to yet another embodiment, the POU gravity feed water treatment system removes contaminants from water by combining a bio-sand filter and a chlorination/dechlorination process into a single, inline process. In this embodiment, as shown in FIG. 16, untreated water (1600) is poured into a bio-sand filter tank (1602). The bio-sand filter contains multiple layers of material to trap particles of various sizes. As the water passes downward through the sand layers, it approaches a perforated support grid (1604) which allows for water to pass through but prevents any sand from proceeding past the grid. Water collection tray (1606) collects water that passes through the grid and directs the water into a funnel portion of the tray, where a chlorine capsule (1608) resides. The chlorine capsule contains a plurality of openings to allow for water to come into contact with the chlorine and thereby absorb some of the chlorine. Chlorinated water exits the funnel and collects in a tank that may include an air gap (1610) and diffusers (1612). The air gap may be maintained by controlling the flow rate from the funnel to be less than the flow rate from the spigot. The filter (1614), which may be of a carbon type, removes the chlorine from the water and directs it toward the spigot (1616) where it is ready for consumption.

It is important to note that the size of the containers can vary without departing from the scope of the disclosure. For example, small containers around 5 gallons each could be used for treating water as disclosed above, or larger containers of 50, 500, or 1000 gallons or more could also be used. The processes disclosed above are still applicable for various sizes depending upon the volume of water to be treated.

An additional source for untreated water (besides streams, lakes, and rivers) is what is known as "grey water"—non-industrial wastewater generated from domestic processes such as dish washing, laundry and bathing. Grey water can allow for a water cycle process to be created, where water is reused locally rather than being returned to the environment. For example, a sink or washbasin could collect water from hand washing, which would then be poured into the POU water treatment system as disclosed.

In larger applications, such as an apartment building, grey water may be collected in a central location, such as a basement, and then fed into the water treatment system as disclosed. The treated water can then be piped back into the supply system, or used to flush toilets or for other household uses. In addition to reducing the water use of the building, the amount of water entering the sewage system from the building is also reduced. A structure's water drainage and supply pipes are configurable to allow for separate routing of solid waste from toilets and liquid waste from sinks, washing machines, and dishwashers. Thus the grey water from the latter is routed to a collection tank in the structure and not into the local sewage system. The treated water by the processes disclosed above, is then either piped separately to dispensing points, such as sinks, washing machines, or toilets, or is combined with the outside potable water supply.

VI. Mini-Biosand Water Treatment System with Improved Filter

According to one embodiment, the POU gravity feed water treatment system removes contaminants from water by adding an improved filter to remove particulate matter from water, deactivate microorganisms and remove additional particulates and biological matter.

The current embodiments address the ineffectiveness of typical bio-sand filters in the first few inches of the bed. Waste may be reduced, unnecessary materials may be eliminated, and the ease of use of the water treatment system may be increased by reducing the amount of sand. As a result, the overall size of the system is smaller than typical bio-sand filters. For example, one embodiment of the present invention may be approximately 29" tall and approximately 12" in diameter. In addition, issues found in typical bio-sand filters may be addressed. For example, some typical bio-sand filters function like a chromatographic column with larger particles being caught in the upper boundary of the sand bed and progressively smaller particles passing through to lower regions in the sand bed. Particles not caught in the sand bed pass entirely through with the effluent water.

The mini-biosand water treatment system may be used alone or in conjunction with a flocculation and coagulation step prior to treatment. It may also be used alone or in conjunction with a post treatment to chlorinate and optionally dechlorinate the treated water.

A. Sand Bed Filter

Figure 17:
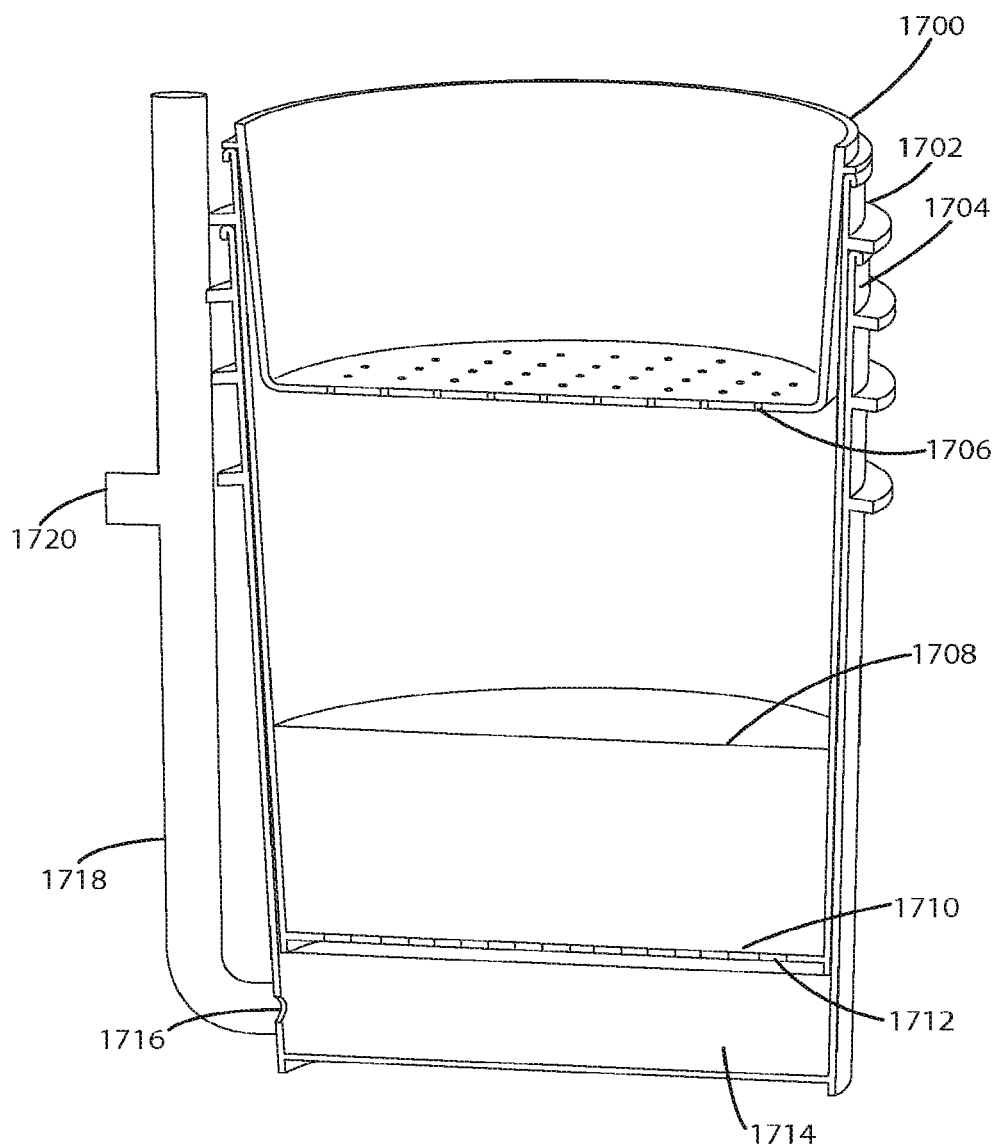
FIG. 17 is an illustration of a bed of sand filtration system according to at least one embodiment.
Figure 17A:
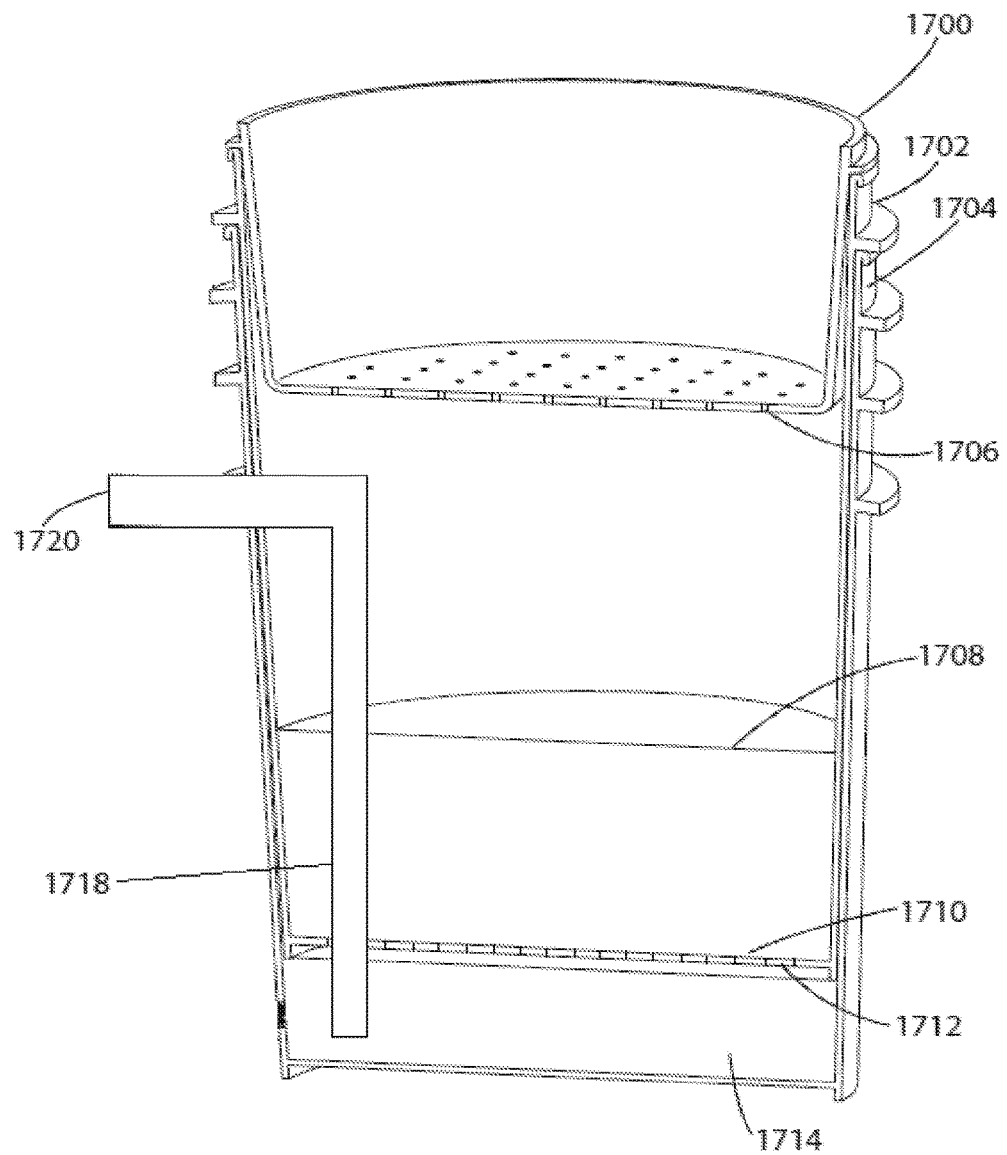
FIG. 17a is an illustration of an alternative embodiment of a bed of sand filtration system.
Figure 18:
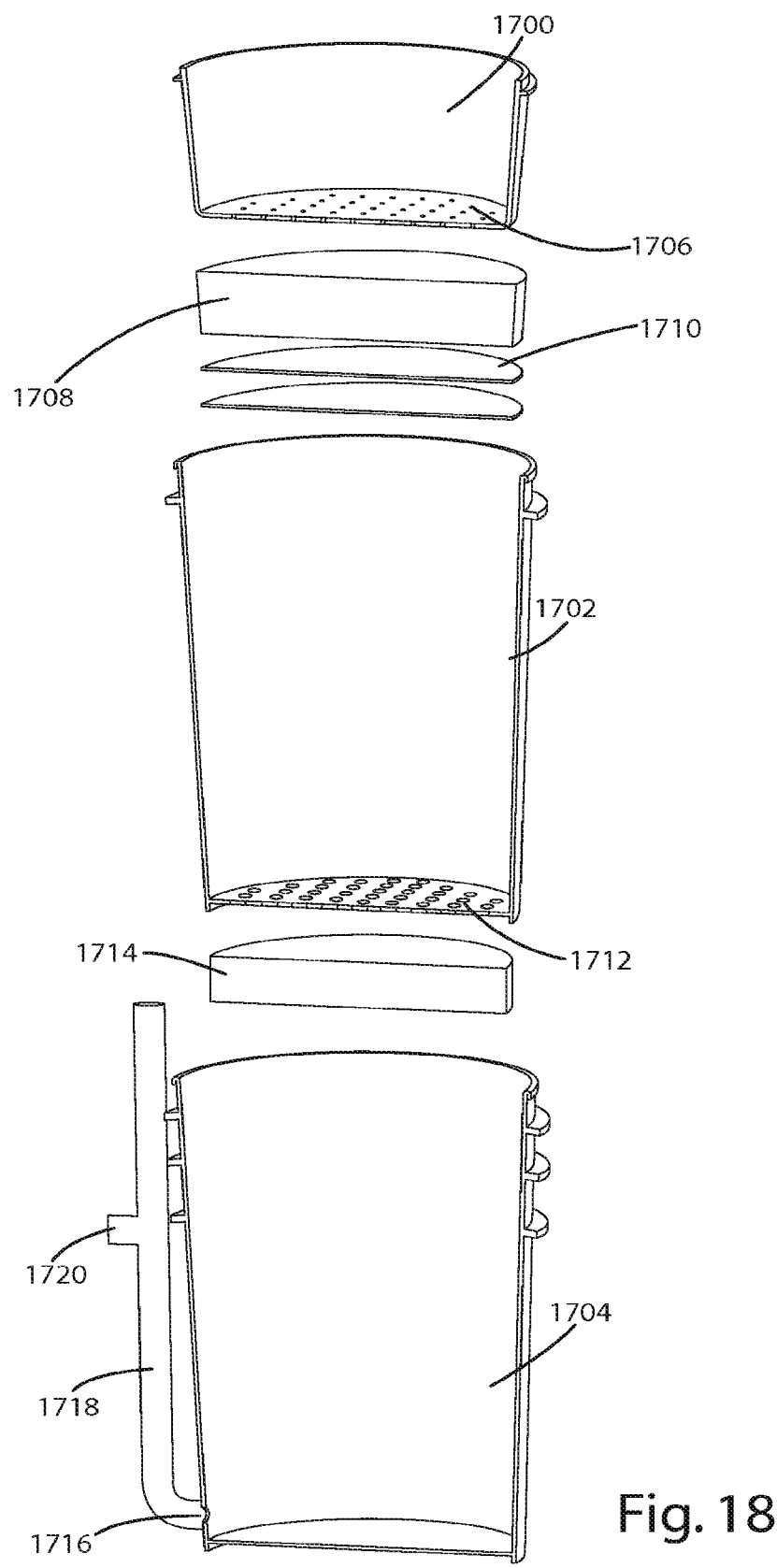
FIG. 18 is an exploded view illustration of the embodiment described in FIG. 17.

One embodiment of a mini-biosand water treatment system including an improved sand bed filter is illustrated in FIG. 17. An outer bucket (1704) contains a layer of gravel (1714). An outlet pipe (1718) draws water from the outer bucket through a hole (1716) located below the level of the gravel layer. An outlet in the pipe (1720) is located at an elevation set above the top of the sand bed (1708), which is located in the inner bucket (1702). The inner bucket nests in the outer bucket and has holes in the bottom surface (1712) which allow water to pass from the inner bucket to the outer bucket. Contained in the inner bucket are two layers of a non-woven filter media (1710), for example wicking paper, set above the holes in the bottom of the inner bucket but below the bed of sand. A water strainer (1700) is nested in the inner bucket and has holes in the bottom surface (1706). Optionally, the outlet pipe (1718) may be located within the outer bucket (1704) and inner bucket (1702). FIG. 18 shows an exploded view of the embodiment of FIG. 17.

Figure 23:
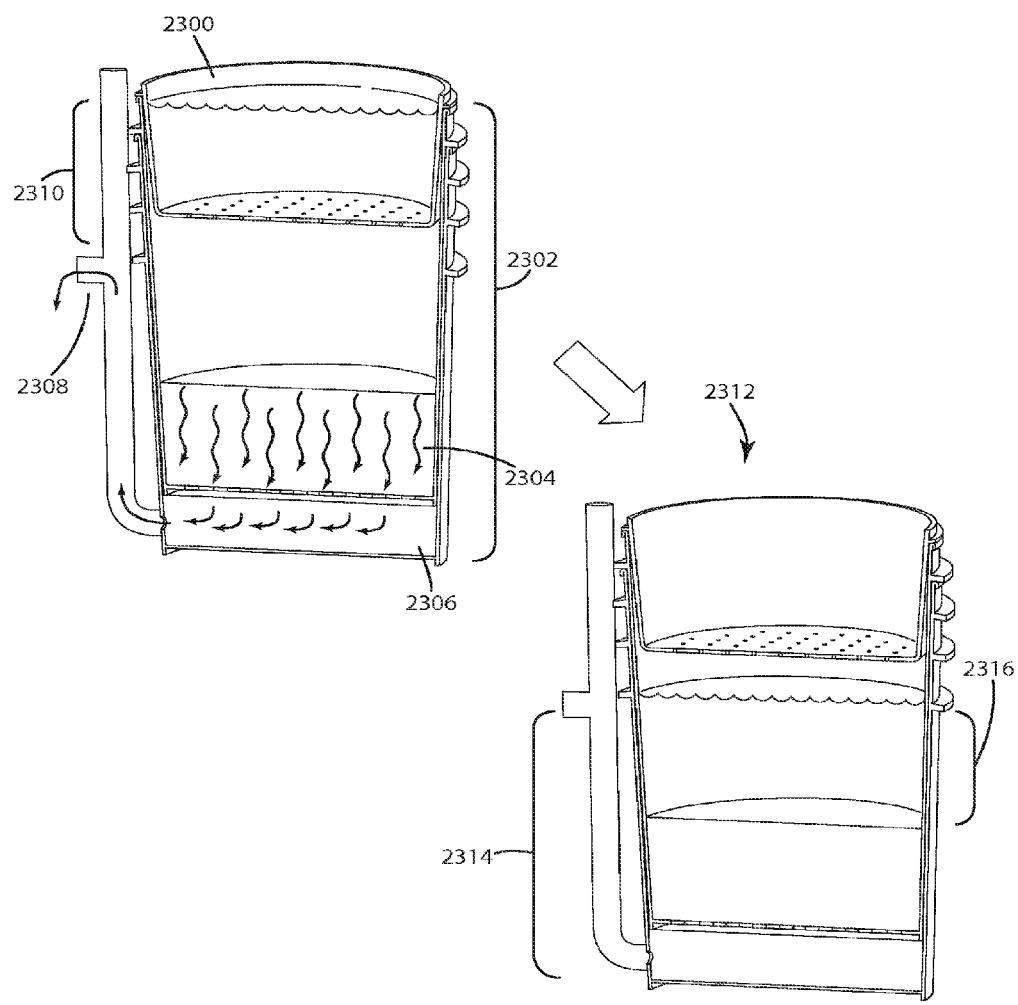
FIG. 23 illustrates an embodiment of operation of a mini-biosand water treatment system.

Referring to FIG. 23, when water enters the mini-biosand water treatment system it first passes through the water strainer (2300) which settles the agitation caused by pouring water into the system. The top layer of the sand bed contains biological agents that can be affected by agitation. The water then passes through a bed of sand (2304). The sand traps particulates and microbes. The resident flora of microbes living in the top layer of sand tend to destroy natural organic matter and other microbes. The result in the effluent water is a reduction in natural organic mater and microbes. The water then passes through the non-woven media filters and the holes in the bottom of the inner bucket. One function of the non-woven media is to prevent sand from being lost through the holes in the bottom of the inner bucket. After the water passes through the holes in the inner bucket it then flows in the cavity formed between the bottom of the outer bucket and the bottom of the inner bucket. This cavity may or may not be filled with gravel (2306). The gravel, if included, provides structural support to the bottom of the inner bucket just above it. Alternatively (but not shown in the drawing) the gravel may be replaced with other larger packing objects such as marbles, or plastic beads or a grid work of support ribbing. The water exits the bottom of the outer bucket through a hole and is channeled through a pipe to an outlet (2308). The relative elevation of the pipe outlet to the height of the sand and the height of a full bucket of water (2310) are factors that determine how much and how fast the water flows through the system. The elevation of water when the bucket is full (2302) helps determine the initial water pressure placed on the sand bed. In general, the higher the water pressure, the faster the water is able to flow through the system. The height of the outlet pipe (2314) establishes the point where water will stop flowing through the system. If the elevation of the water in the bucket drops to a level equal with the height of the outlet pipe (2312) then the water pressure will equilibrate and stop flowing. In the current embodiment, the water stops flowing at a height slightly higher than the level of the sand. This ensures that a small depth of water is always covering the sand and the biological layer remains intact (2316).

Using the recommended maximum face velocity given by Manz, calculations can be used to determine the minimum face area of any geometry filter. Additionally, given the desired maximum flow rate of the system, the minimum diameter of a round sand bed filter can be calculated. Additionally, given the desired maximum flow rate of the system, the minimum side length of a square sand bed filter can be calculated.

All of the following equations are derived from the governing equation:

$$F = V * A$$

F = flow rate
V = face velocity through a filter
A = face area of the filter

For any desired maximum flow rate, the minimum face area of the filter bed can be calculated by the equation:

$$A\ min = \text{minimum face area of filter bed (cm}^2)$$

$$A\ min = F\ max / V\ max$$

F max = maximum flow rate desired for the application (ml/min)
V max = maximum recommended face velocity (1 cm/min) from Manz

Example

The maximum flow rate required for an application is 1000 ml/min. Find the minimum face area of the filter bed.

Solution: $A\ min = (1000\ cm^3/min)/(1\ cm/min) = 1000\ cm^2$

For a circular sand bed the minimum face diameter is determined by the equation:

$$D\ min = 2 * ((F\ max)/(V\ max * Pi))^{0.5}$$

D min = minimum diameter of circular sand bed filter
F max = maximum flow rate desired for the application (ml/min)
V max = maximum recommended face velocity (1 cm/min) from Manz Pi = 3.14

Example

The maximum flow rate required for an application is 1000 ml/min. Find the minimum face diameter of a round filter bed.

Solution: $D\ min = 2 * (1000\ cm^3/min)/(1\ cm/min * 3.14))^{0.5} = 35.7\ cm$

For a square sand bed the minimum side length is determined by the equation:

$$S\ min = (F\ max / V\ max)^{0.5}$$

S min = minimum side length of square sand bed filter

Example

The maximum flow rate required for an application is 1000 ml/min. Find the minimum side length of a square filter bed.

Solution: $S\ min = (1000\ cm^3/min/1\ cm/min)^{0.5} = 31.6\ cm$

Alternatively, for a given filter area, the maximum recommended flow rate can be calculated.

$$F\ max = V\ max * A$$

F max = maximum recommended flow rate through the given system
V max = maximum recommended face velocity (1 cm/min) from Manz
A = filter face area of the given system

Example

The face area of a given filter bed is 1000 cm^2. Find the maximum recommended flow rate through the system.

Solution: $F$ max=1 cm/min*1000 cm^2=1000 cm^3

Figure 24:
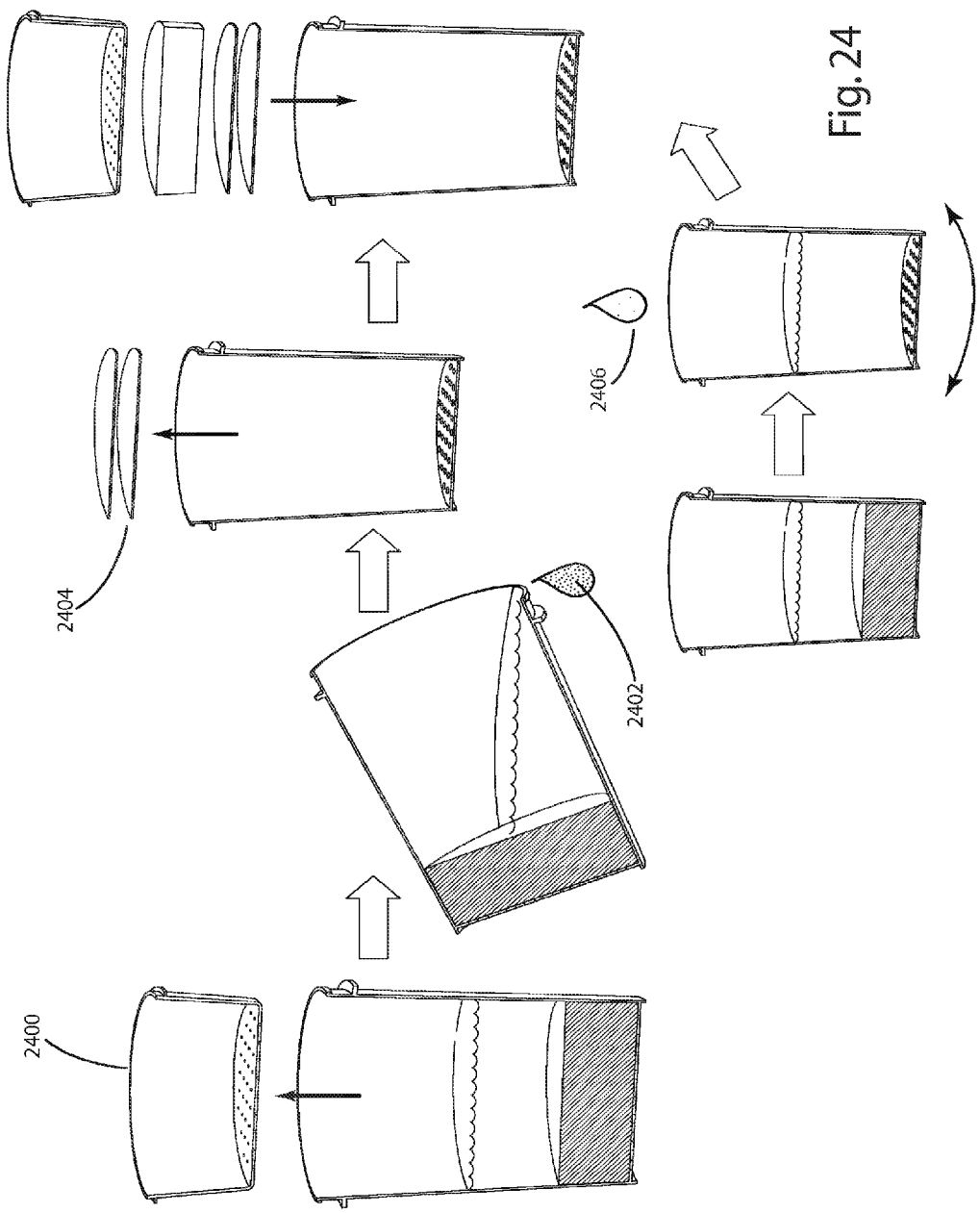
FIG. 24 illustrates an embodiment of a process for cleaning and maintenance of a mini-biosand water treatment system.

A procedure for cleaning the bed of sand is shown in FIG. 24. To clean the sand, the water strainer (2400) is removed and set aside. The inner bucket (1702) is lifted up and out of the outer bucket (1704). The inner bucket at this point contains the sand (1708). The sand in the inner bucket is poured (along with any remaining water) into a clean bucket (2402). Fresh clean water is added to the cleaning bucket. The water and the sand are stirred or otherwise agitated to ensure all sand particles are exposed to the fresh water (2406). The sand is allowed to settle to the bottom of the cleaning bucket. The mixture of water and fine particles is decanted from the bucket. This process may be repeated multiple times until the water being decanted is visually free from fine particles. The non-woven filter media in the bottom of the inner bucket is removed and discarded (2404). New non-woven filter media is placed in the bottom of the inner bucket. The cleaned sand is returned to the inner bucket. The inner bucket is placed back in the outer bucket. The water strainer is placed back in the inner bucket. The system is then ready for water to be added and filtered.

Figure 22:
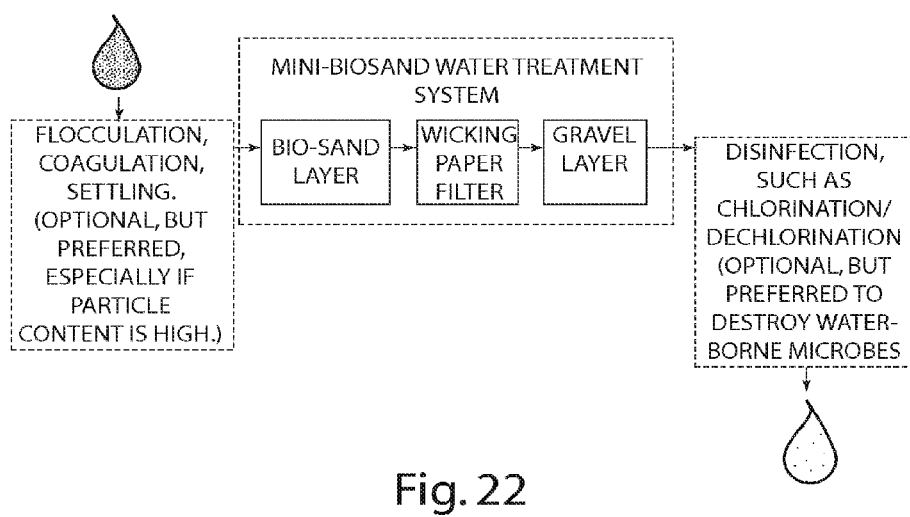
FIG. 22 illustrates a flow chart of an embodiment of a mini-biosand water treatment process.

According to one embodiment, the POU gravity feed water treatment system removes contaminants from water by a flocculation and coagulation step prior to treatment. It may also be used alone or in conjunction with a post treatment to chlorinate and optionally dechlorinate the treated water. Likewise, all three of these steps may be optionally used in sequence with one another, as shown in FIG. 22.

B. Pressed Block Filter

According to one embodiment, the POU gravity feed water treatment system removes contaminants from water by adding a pressed block filtering process to remove particulate matter from water, deactivate microorganisms and remove additional particulates and biological matter. Further, the pressed block filter improves the ease of cleaning and replacing the pressed block filter in the system.

Figure 19:
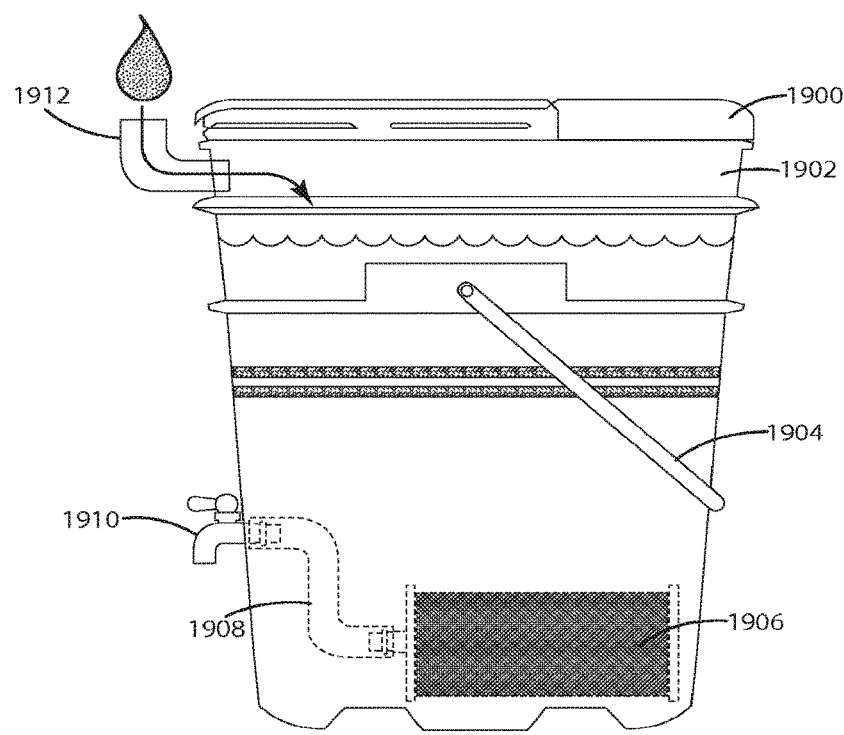
FIG. 19 is an illustration of an alternate embodiment of a pressed block filtration system.
Figures 20A, 20B:
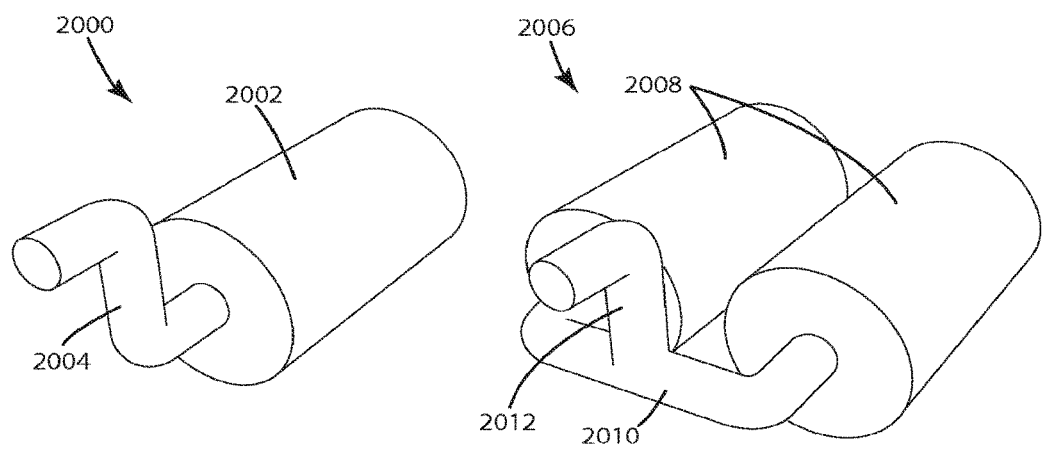
FIG. 20a illustrates a single filter pressed block according to at least one embodiment.
FIG. 20b illustrates a two-filter pressed block according to at least one embodiment.
Figure 21:
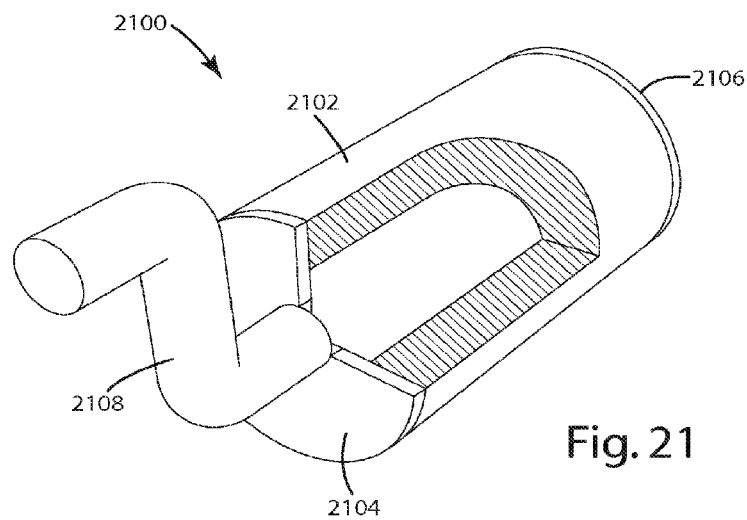
FIG. 21 illustrates components of a pressed bio-sand block filter according to at least one embodiment.

In another embodiment a mini-biosand water treatment system including a pressed block bio-sand filter is illustrated in FIG. 19. The system includes a bucket (1902) that may include a snap on lid (1900). A section of the lid of the bucket may optionally be hinged to allow easy access to the interior of the bucket during maintenance procedures. A water inlet pipe (1912) is located at or near to the top of the bucket to accept water from a hose, pipe or any other method of feeding water into the system. The bucket is optionally supplied with a carrying handle (1904) for ease of transportation and maintenance. Inside and at or near the bottom of the bucket is a pressed block filter (1906). The pressed block filter is constructed of a filter media, such as sand or activated carbon, and a polymer binder. The binder may be an ultra high molecular weight polyethylene. The binder holds the block in shape but does not completely coat the surface of the media particles. Both or either sand and activated carbon media may function in the system. After water flows through the pressed block filter it flows through a pipe network (1908) to a spigot (1910) located on the side of the bucket. The level of the spigot is set above the top of the pressed block filter. One or multiple pressed block filters may be used inside the bucket. FIG. 20a shows the configuration (2000) when only one filter (2002) is used with a simple pipe network (2004). FIG. 20b shows the configuration (2006) when two filters (2008) are plumbed in parallel with a network piping (2010) that brings the outlet water from each filter to a single point (2012) for delivery through the spigot. In a similar manner, additional filters could be added to a system using pipe tees.

The pressed block filter may be made with sand as the main filter media. However, it may be made of diatomaceous earth, perlite, activated carbon, other inorganic filter media and mixtures thereof. The current embodiment of the pressed block filter includes commercially available sand with a particle size distribution as described in Table 1. The sand particles are bonded together in the block by a high molecular weight or ultra-high molecular weight polyethylene. In this embodiment, the block composition is 80% to 90% sand by weight and 10% to 20% binder by weight. The current embodiments of the sand block have lengths of 16 to 25 cm, outer diameter of 8 to 14 cm, and inner diameter of 3 to 9 cm.

In one embodiment, the composition of the sand block is 88% sand by weight and 12% binder by weight. The dimensions of the block are 22 cm length, 10.7 cm outer diameter and 5.6 cm inner diameter.

TABLE 1

Particle Size Distribution Used in Current Embodiment

| US Sieve | Opening (inches) | Opening (mm) | Cumulative Wt % Passing | Cumulative Wt % Retained | Individual Wt % Retained |
| --- | --- | --- | --- | --- | --- |
| 30 | 0.0234 | 0.59 | 92-100 | 0-8 | 0-8 |
| 40 | 0.0165 | 0.42 | 82-97 | 3-18 | 2-14 |
| 50 | 0.0117 | 0.30 | 69-90 | 10-31 | 7-20 |
| 70 | 0.0083 | 0.21 | 48-75 | 25-52 | 12-27 |
| 100 | 0.0059 | 0.15 | 27-55 | 45-73 | 14-33 |
| 140 | 0.0041 | 0.11 | 7-30 | 70-93 | 15-30 |
| 200 | 0.0029 | 0.08 | 1-12 | 88-99 | 6-22 |
| 270 | 0.0021 | 0.05 | 0-2 | 98-100 | 0-12 |
| Pan | Pan | | | | |

The bio-sand block filter (2100) of the present invention is manufactured using conventional manufacturing techniques and apparatus. In general, the binder (in powder form) and sand are uniformly mixed so that the binder is uniformly dispersed throughout the sand. In some embodiments, the binder is between about 10 to 20 percent, and in one particular embodiment about 12 percent, by weight based on the combined weight of the sand and the binder. The combined sand and binder are fed into a conventional cylindrical mold (not shown) having an upwardly projecting central dowel. The mold and its contents are then heated to from about 190 to about 235 degrees centigrade and most preferably about 204 degrees centigrade. Simultaneously, the combined sand and binder are subjected to from about 100 to about 600 pounds of compression force, and preferably about 300 pounds, via a conventional pressure piston (not shown), which is lowered into the mold and which includes a central clearance opening for the central dowel. The combined sand and binder are then permitted to cool and the resulting structure is removed from the mold in the form of an integrated sand sleeve (2102). The sand sleeve (2102) is then trimmed to length, if necessary.

The top end cap (2104) and bottom end cap (2106) can be separately manufactured, for example, by conventional injection molding, and then attached to the sand sleeve (2102) by cement, adhesive or otherwise. If desired, a threaded insert can be used in the molding process of the top end cap to provide a threaded member for attaching the bio-sand block filter (2100) to a suitable pipe or fitting (2108). Alternatively, the top end cap can be molded with a cylindrical protrusion and grooves for o-rings to seal when the protrusion is inserted into a suitable pipe or fitting.

Figure 25:
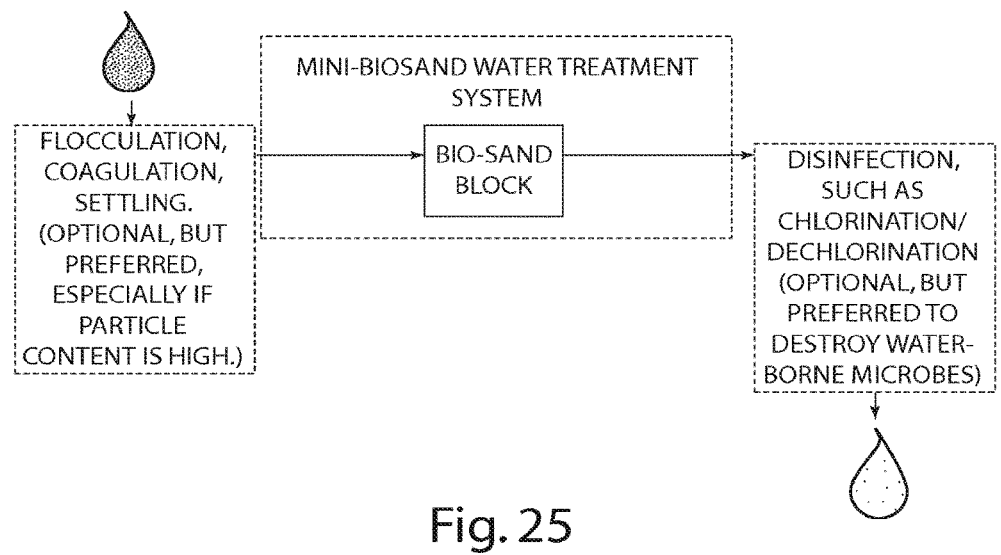
FIG. 25 illustrates a flow chart of one embodiment of a pressed block filter process.
Figure 26:
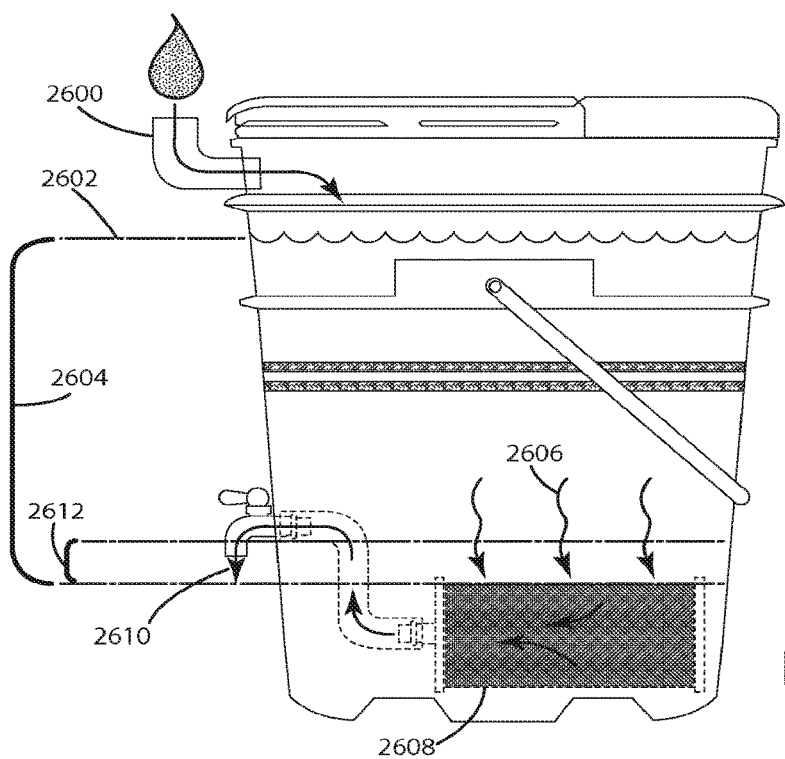
FIG. 26 illustrates an embodiment of operation of a mini-biosand water treatment system with a pressed block filter.
Figure 27:
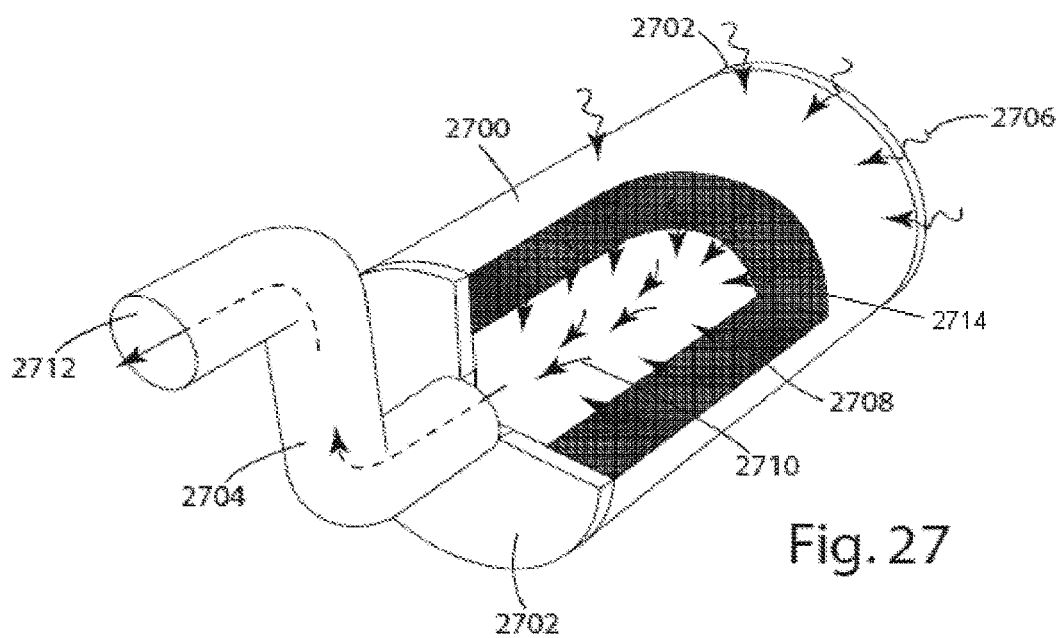
FIG. 27 illustrates water flow through one embodiment of a pressed block filter.

A flow chart of one embodiment of a pressed block filter process is shown in FIG. 25. Turning to FIG. 26, water may optionally be pre-treated before entering the mini-biosand water treatment system. When water enters the mini-biosand water treatment system it first passes through an inlet pipe or funnel (2600) and collects in the bucket to a water level (2602). The elevation of the water (2604) above the filter block establishes a water head pressure on the surface of the pressed block filter (2608) and causes water to flow through the filter media. The water then passes radially through the filter block (2606) and gathers in the hollow center core of the block (2608). The filter block traps particulates and microbes. The resident microbes living in the outer layer of the block tend to destroy natural organic matter and other microbes. The result in the effluent water is a reduction in natural organic mater and microbes. The water then passes through the pipes to a spigot (2610) in the side of the bucket. The relative elevation of the outlet spigot to the height of the filter block and the height of a full bucket of water determines how much and how fast the water flows through the system (2612). The elevation of water when the bucket is full (2604) determines the initial water pressure placed on the bio-sand filter. The higher the water pressure, the faster the water is able to flow through the system. The height of the outlet spigot (2612) above the top of the filter block establishes the point where water will stop flowing through the system and ensure the filter block remains wet. Another mini-biosand water treatment system configuration is shown in FIG. 27. The water passes radially (2706 and 2708) through the filter block (2700). Optionally, there may be an outer scrum and/or foam layer (2714) on the surface of the filter block to remove particles from the water before water enters the filter block. The end caps (2702) encourage water flow through the filter block. The water gathers in the hollow center core of the block (2710) and flows through the outlet pipe (2704) towards the outlet spigot of the system (2712).

Using the recommend maximum face velocity given by Manz, calculations can be used to determine the minimum face area of a cylindrical pressed block filter. Additionally, given the desired maximum flow rate and filter length, the minimum diameter of the pressed block filter can be calculated. Additionally, given the desired maximum flow rate and filter diameter, the minimum length of the pressed block filter can be calculated.

All of the following equations are derived from the governing equation:

$$F = V * A$$

F=flow rate
V=face velocity through a filter
A=face area of the filter

For any desired maximum flow rate, the minimum face area of the pressed block filter can be calculated by the equation:

$A$ min=minimum face area of the pressed block filter (cm^2)

A min=F max/V max
F max=maximum flow rate desired for the application (ml/min)
V max=maximum recommended face velocity (1 cm/min) from Manz

Example

The maximum flow rate required for an application is 1000 ml/min. Find the minimum face area of the filter block.

Solution: $A$ min=(1000 cm^3/min)/(1 cm/min)=1000 cm^2

For a given pressed block length the minimum block diameter is determined by the equation:

$D$ min=$F$ max/($L*V$ max*Pi)

D min=minimum diameter of pressed block filter (cm)
F max=maximum flow rate desired for the application (ml/min)
V max=maximum recommended face velocity (1 cm/min) from Manz
L=length of the pressed block filter (cm)
Pi=3.14

Example

The maximum flow rate required for an application is 1000 ml/min. The length of the block is 20 cm. Find the minimum diameter of the filter block.

Solution: $D$ min=(1000 cm^3/min)/(20 cm*1 cm/min*3.14)=15.9 cm

For a given pressed block diameter the minimum block length is determined by the equation:

$L$ min=$F$ max/($D*V$ max*Pi)

L min=minimum length of pressed block filter (cm)
F max=maximum flow rate desired for the application (ml/min)
V max=maximum recommended face velocity (1 cm/min) from Manz
D=diameter of the pressed block filter (cm)
Pi=3.14

Example

The maximum flow rate required for an application is 1000 ml/min The diameter of the block is 15 cm. Find the minimum length of the filter block.

Solution: $L$ min=(1000 cm^3/min)/(15 cm*1 cm/min*3.14)=21.2 cm

Alternatively, for a given pressed filter area, the maximum recommended flow rate can be calculated.

$F$ max=$V$ max*$A$

F max=maximum recommended flow rate through the given system
V max=maximum recommended face velocity (1 cm/min) from Manz
A=filter face area of the given system

Example

The face area of a given filter block is 1000 cm^2. Find the maximum recommended flow rate through the system.

Solution: $F$ max=1 cm/min*1000 cm^2=1000 cm^3/min

Alternatively, for systems with multiple, equal-sized, pressed blocks flowing in parallel, the maximum recommended flow rate can be calculated.

$F$ max=$V$ max*$A*n$

F max=maximum recommended flow rate through the given system
V max=maximum recommended face velocity (1 cm/min) from Manz
A=filter face area of each pressed block filter
n=number of pressed block filters flowing in parallel Example A system contains two pressed block filters flowing in parallel. The face area of each filter block is 1000 cm^2. Find the maximum recommended flow rate through the system.

Solution: F max=1 cm/min*1000 cm^2*2=2000 cm^3/min

Figure 28:
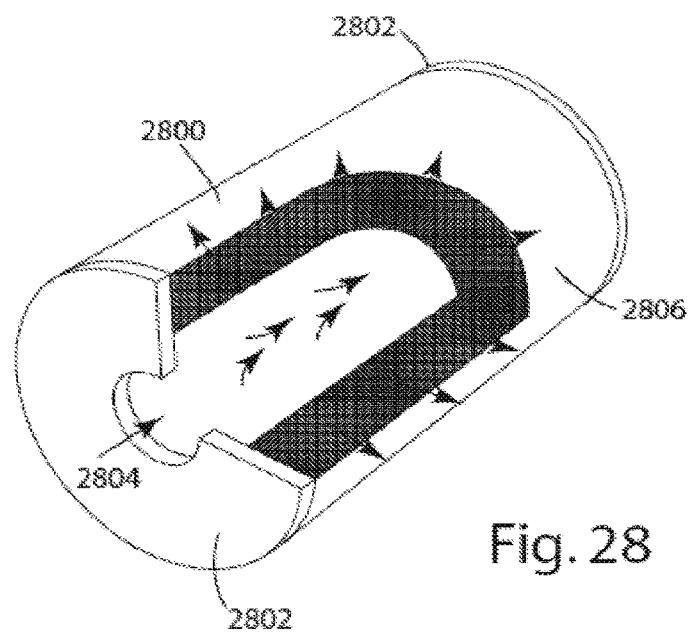
FIG. 28 illustrates one embodiment of a procedure for cleaning and maintenance of a pressed block filter.

To clean the filter block the lid at the top of the bucket is either opened or removed. The filter block is disconnected from the piping and removed from the bucket. At this point, the filter block may be discarded and replaced with a new filter block. Alternatively, the filter block may be partially regenerated by pumping water through it in a direction backwards from the normal flow direction, as shown in FIG. 28. Water is fed into the hole (2804) in the end cap (2802) and flows radially outward (2806) through the radial filter block (2800). This reverse pumping may be accomplished by an electric pump and hose or a manual pump and hose. Optionally, outer scrum and/or foam layer (2714) may be brushed or rinsed to remove additional particles.

Figure 29:
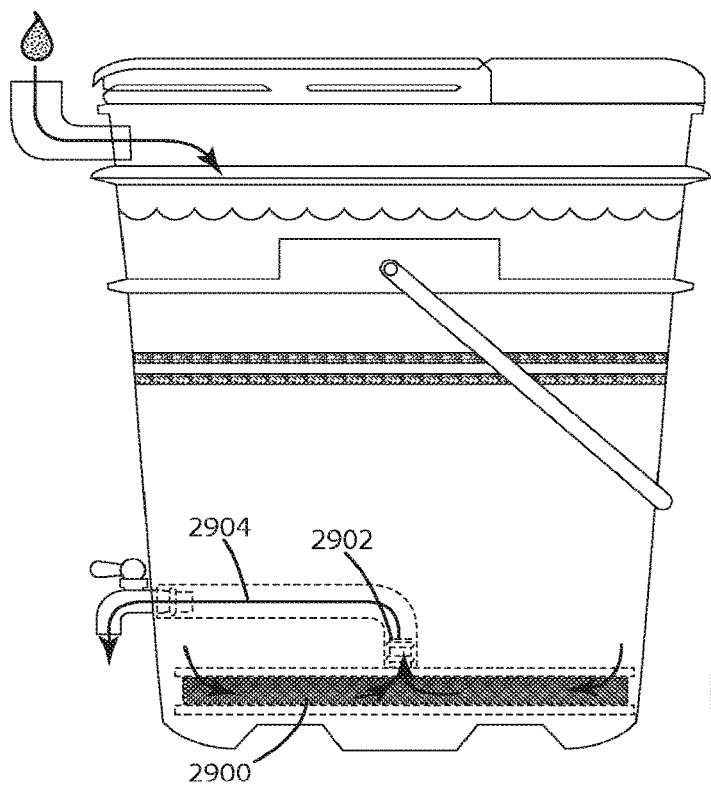
FIG. 29 illustrates an alternate embodiment of a pressed block filter with a diameter much larger that the length.

An alternative embodiment of the mini-biosand water treatment system is illustrated in FIG. 29. The mini-biosand water treatment system includes a pressed block filter (2900) with a diameter larger that its length. Water flows through the end cap (2902) and outlet pipe (2902) to the spigot.

VII. Flocculation+Improved Filter+Chlorination/Dechlorination

According to both of the aforementioned embodiments, the mini-biosand water treatment system removes contaminants from water by serially treating it with a flocculation process, the mini-biosand filtration process and a chlorination/dechlorination process.

According to one embodiment, the POU gravity feed water treatment system removes contaminants from water by adding a bio-sand filtering process to the flocculation and chlorination/dechlorination processes to enable users to remove particulate matter from water and deactivate microbes.

As disclosed above, in rural or undeveloped areas, water may be gathered in a container or tank from a water source such as a lake, river, or well. In some cases this water may be extremely turbid from a high particulate concentration. In these cases, it would be beneficial to treat the water in a flocculation, coagulation and settling process prior to pouring or piping the water into the mini-biosand water treatment system. The flocculation process will remove a large amount of the particulate matter from the water thereby extending the life of the sand bed and paper filters or the pressed block filter in the mini-biosand water treatment system.

After water has passed through the mini-biosand water treatment system it is poured or piped to a chlorination/dechlorination process. In one embodiment, this process disinfects additional microbes in the water giving the overall sequence of filtration steps a total destruction of microbes of greater than 99.99%. After passing through the chlorination/dechlorination process the water is ready for consumption.

VIII. Siphon

Figure 30:
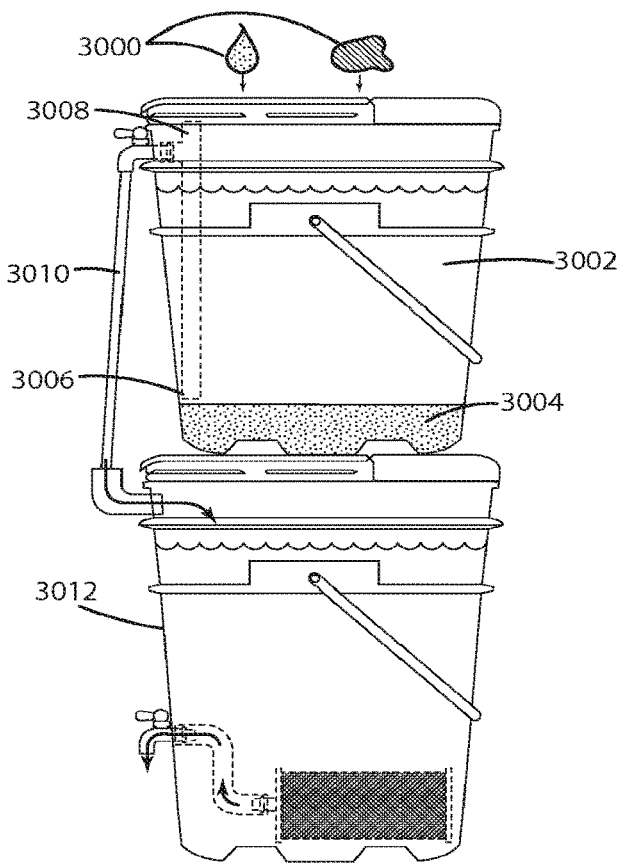
FIG. 30 illustrates a flocculation device according to at least one embodiment used as a pretreatment for the water.

Referring to FIG. 30, an embodiment of the water treatment system is depicted with a flocculation step prior to bio-sand filtration. Water flow and flocculation chemical (3000) are poured into the system. Water sits in flocculation tank (3002) for a time. During this period particles (3004) coagulate and settle to the bottom of the tank. The outlet pipe (3006) draws water from the bucket after the flocculation process is complete. The level of the pipe may be set above the level of the particles that settled to the bottom of the tank. A one way valve (3008) at the top of the water outlet pipe allows air to escape. When the bucket is filled to a level at or above the level of the spigot then the outlet pipe tube, the spigot and the down-tube will form a siphon after the air escapes through the one way valve (3008). Water exits through the outlet spigot (3010) and flows through the down-tube into the next stage of the water treatment system (3012). In the current embodiment, the next stage of the water treatment system is the bio-sand stage as described above.

When performing the flocculation process one parameter is dosing of flocculation chemical into the water. In order to assist the user in making the correct dosing a standard sized bucket is used and a predetermined quantity of flocculation chemical is prescribed for the user to add to the water. If the water level is not correct, then an improper dose of flocculation chemical may result.

In an effort to encourage the user to completely fill the flocculation bucket a siphon mechanism is included. When water is added to the bucket, the level of water will also rise in the pipe through opening (3102). When the water level in the bucket (3100) reaches a level at or above the spigot (3106) then air will be purged through the one-way valve (3104). After this air is purged and the spigot (3106) is opened then water will flow out and down the tube (3108). The water will continue to flow until it reaches either the level of the inlet tube (3102) or the outlet tube (3110).

Figure 31:
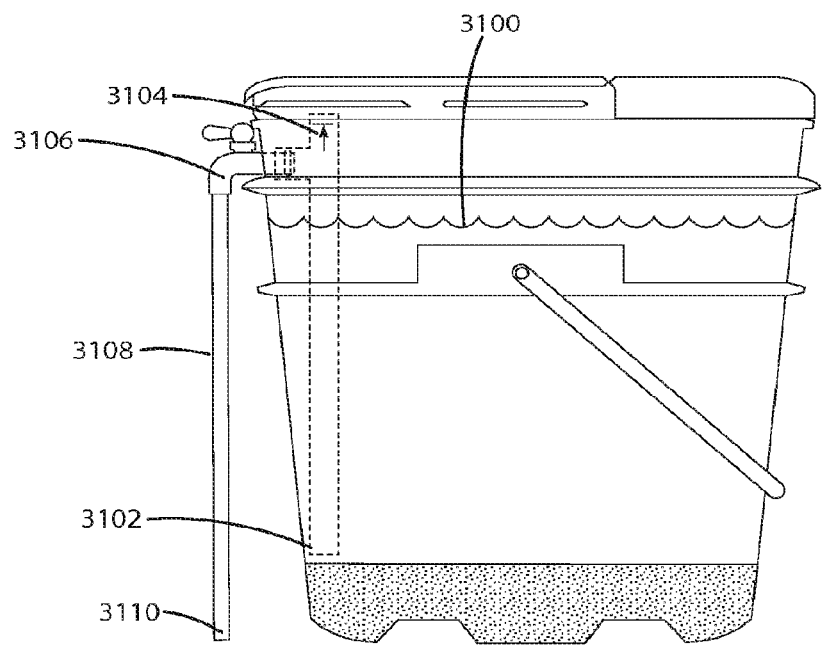
FIG. 31 illustrates an embodiment of a siphon and spigot mechanism to ensure proper flocculation batch size.
Figure 32:
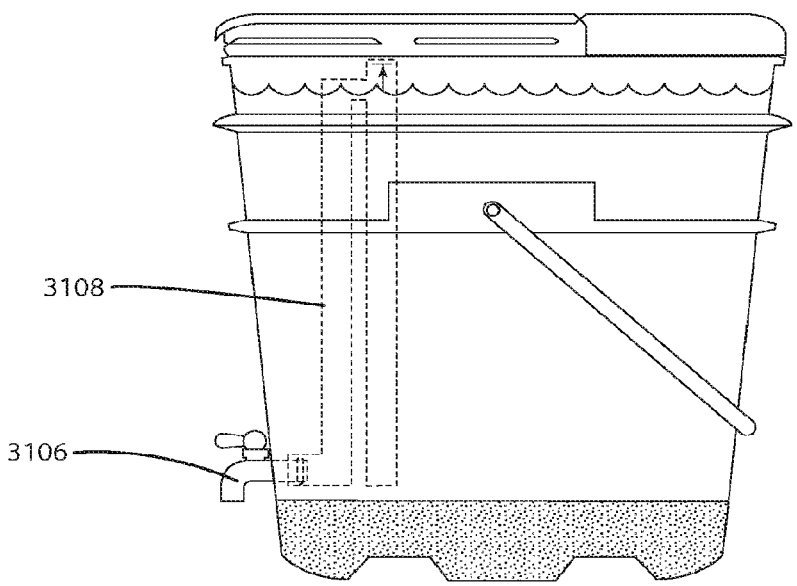
FIG. 32 illustrates an alternate siphon and spigot mechanism to ensure proper flocculation batch size.

Referring to FIG. 32, an alternative embodiment of the siphon mechanism is illustrated. Two differences from the FIG. 31 siphon mechanism are that the down-tube (3108) is located inside the bucket and that the spigot (3106) is located at the bottom end of the down-tube. This embodiment has fewer components on the exterior of the bucket.

Figure 33:
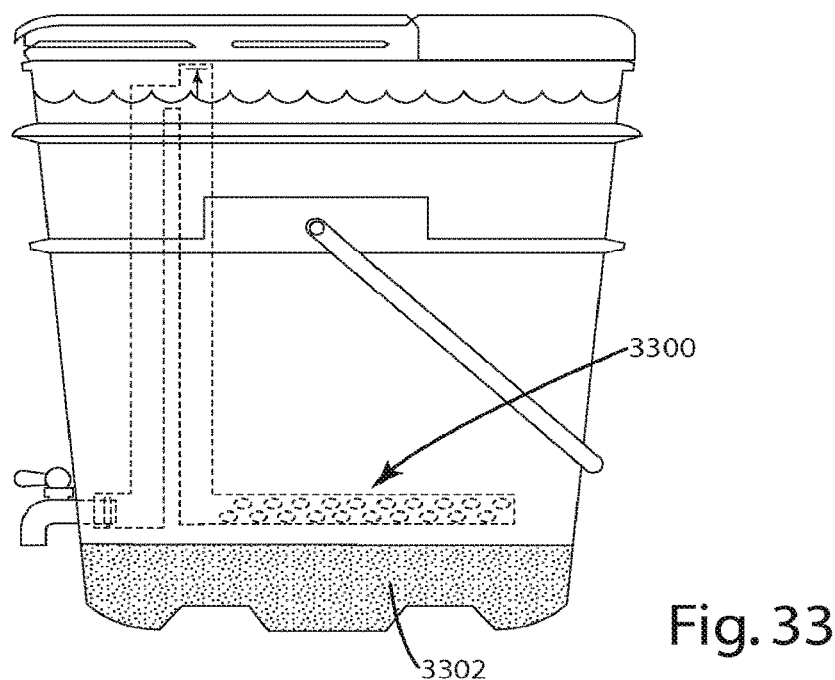
FIG. 33 illustrates an optional diffuser to reduce disturbance of the sediment layer on the bottom of the flocculation tank.

FIG. 33 shows another alternative embodiment of a siphon mechanism. The current embodiment includes a diffuser (3300) on the inlet of the siphon mechanism. The diffuser reduces the velocity of the water entering the siphon mechanism, thereby, reducing the chances of disturbing and suctioning the particles (3302) that settled on the bottom of the bucket. Although shown attached to the FIG. 33 embodiment, the diffuser may be used in conjunction with other embodiments of the siphon mechanism, such as the embodiment shown in FIGS. 31 and 32. The construction of the diffuser may be as simple as a pipe connected by an elbow to the inlet of the siphon mechanism. The pipe may have slots or holes in it. The aggregate of all of the slots or holes presents a large inlet surface area for water to flow through. This results in reduced water velocity at any given inlet hole.

IX. Chlorinator Device

Figure 34:
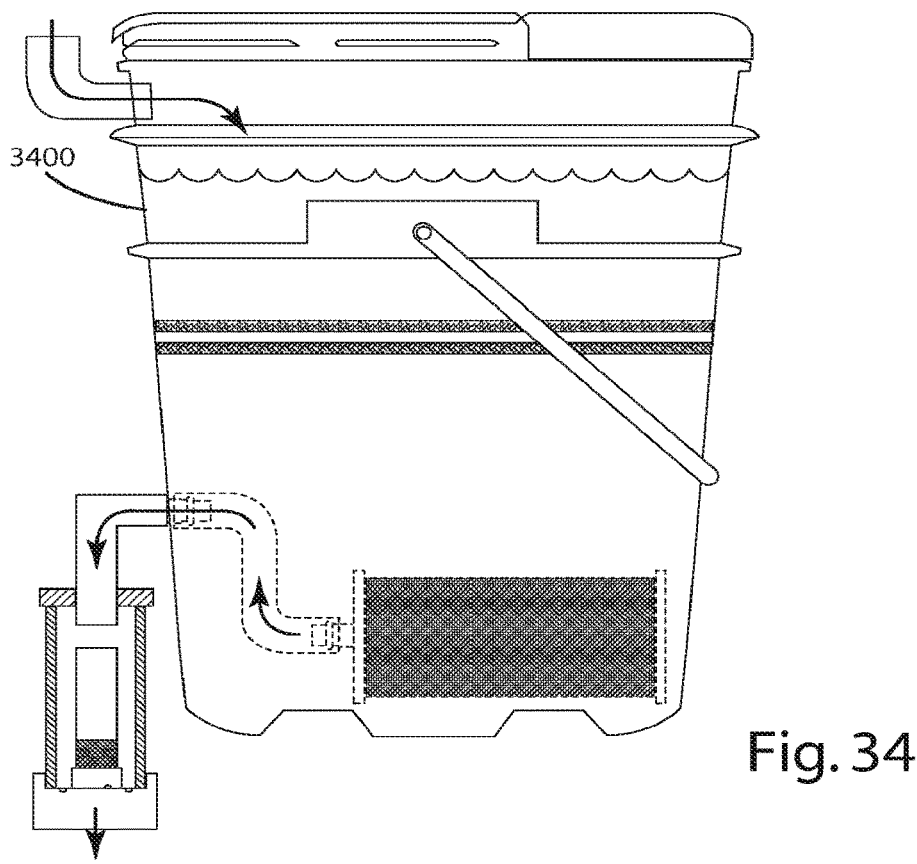
FIG. 34 illustrates a chlorinator device on the outlet of a mini-biosand water treatment system according to at least one embodiment.

Referring to FIG. 34, an embodiment of a chlorinator device on the outlet of the mini-biosand water treatment system is illustrated. Although shown and described in conjunction with the mini-biosand water treatment system (3400), the chlorinator device may be used in conjunction with other water treatment systems. Water exits the mini-biosand water treatment system (3400) and enters the chlorinator device.

FIG. 35 shows the components and features of one embodiment of a chlorinator device. The chlorinator device includes a chlorinator inlet flow tube (3500), a flow container (3502), a chlorine capsule (3504) (sometimes referred to as a chlorine "cartridge"), a chlorine tablet (3506), a cap for the chlorine capsule (3508), a chlorinator outlet flow tube (3510), a bypass flow path (3512), slots in the side of chlorine capsule (3514), an outlet hole in the cap of the chlorinator capsule (3516), and a tablet support (3518). Because the chlorinator device is attached outside of the bucket instead of floating or being attached inside of the bucket, a user can access the chlorinator device without otherwise disturbing the water treatment system or having to deal with unclean water. Further, portions of the chlorinator device may be see-through allowing a user to see how much of the chlorine tablet is left without opening or accessing the chlorinator device.

Referring to FIG. 36, one embodiment of water flow through the chlorinator device shown in FIG. 35 is disclosed. Water enters through the inlet flow tube (3600). Water cascades down the over the top and sides of the chlorine capsule (3602). A portion of the total water flow enters the chlorine capsule through the slots in the side wall (3604). The portion entering the slots is regulated by the size and shape of the slots. The slot sizing may be adjusted during manufacture based on chlorine dosing needs. In general, larger slots and more rounded edges will allow more water to flow into the chlorine capsule. In general, smaller slots with sharp edges will allow less water to enter the capsule. A portion of the total water flow bypasses the chlorine capsule (3606). This water flows to the outlet tube through holes or grooves which allow it to flow past the chlorine capsule. Water flowing inside the chlorine capsule picks up dissolved chlorine from the chlorine tablet (3608). This water flows out through a hole in the cap of the chlorine capsule. The size of the hole regulates the flow rate. Chlorinated water and bypass water recombine in the outlet flow tube and become thoroughly mixed in the container that catches the water (3610). Tablet support (3518) includes spaced support members that support the chlorine tablet while allowing water to flow past the chlorine tablet. In this manner, the tablet support controls exposure of the chlorine tablet (3506) to the water. Optionally, the chlorine tablet may be located at a height above, below, or aligned with the slots in the side of the chlorine capsule, which would vary the interaction between the water and the chlorine tablet. Further optionally, the position, orientation, and number of slots in the side of the chlorine capsule may be altered to change the interaction between the water and the chlorine tablet. The tablet support also positions the tablet at a height where a user may see the chlorine tablet through a transparent window to determine when to replace the chlorine tablet. Optionally, a portion or all of the chlorine capsule may be transparent to allow viewing of the chlorine tablet.

FIG. 37 shows one embodiment of a process for changing the chlorine capsule. The flow container (3502) slides up the inlet tube of the chlorinator (3500). The spent chlorine capsule (3504) is removed from the outlet tube (3510). A new chlorine capsule (3700) is installed in the outlet tube (3510). The flow container (3502) is lowered back into place covering the chlorine capsule.

X. Manual Pump

Some gravity feed water treatment systems are large, heavy, and relatively immobile. Many gravity feed water treatment systems are forced to make trade-offs between flow rate and performance. That is, in order to have a higher flow rate, filtration performance sometimes is sacrificed, or vice versa. A system that operates without pressurized plumbing and without electric power, but offers purification of water approaching the filtration and flow rate performance of a system using pressurized plumbing and electric power is desirable.

In one embodiment, a water treatment system with a pump for assisting water flow provides disinfection, filtration, chemical adsorption, and high flow rates without pressurized plumbing or electric power. In the current embodiment, disinfection is accomplished by adding chlorine to the water as it enters the tank. Filtration and chemical adsorption may be accomplished by passing chlorine treated water through a pleated filter media and pressed carbon block filter. In alternative embodiments, disinfection, filtration and chemical adsorption may be accomplished using different chemicals, filters, or systems. In the current embodiment, a user draws water from the water system using a manually activated piston pump installed on the outlet of the system. As the water is drawn, it passes through one or more filter media that remove chlorine and other contaminants in the water.

Figure 38:
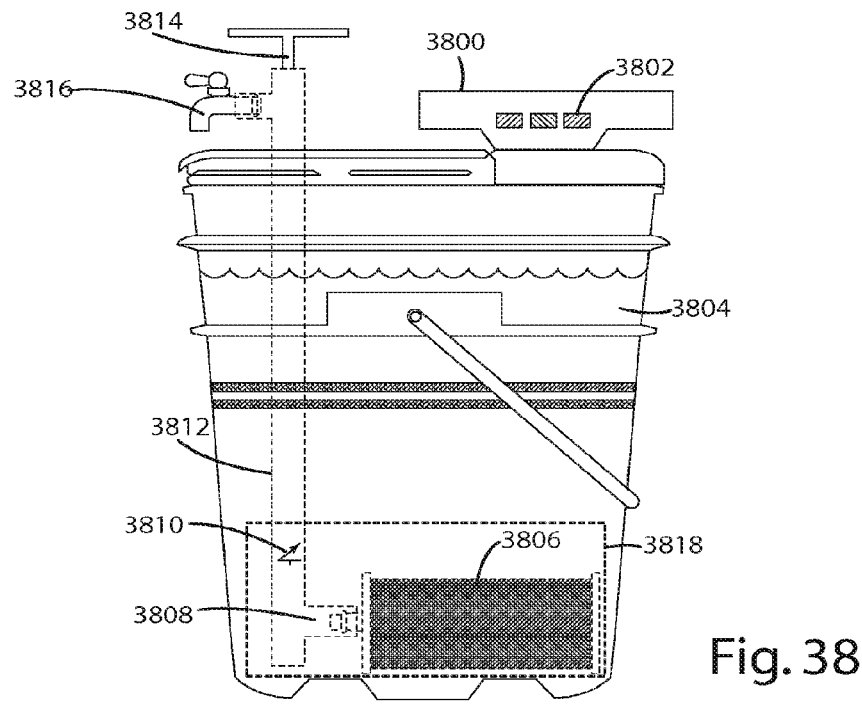
FIG. 38 illustrates one embodiment of a water treatment system with a manual piston pump.

FIG. 38 shows a system where water disinfection, filtration, and chemical adsorption assist in purifying the water. These processes may occur in the absence of electric power or pressurized plumbing. In addition, the current embodiment of the system is capable of delivering a flow rate of one gallon per minute. A wide-mouth funnel (3800) may be provided to accept high flow rates (such as pouring from another bucket) when filling the storage tank (3804). Chlorine tablets (3802) may be installed in the funnel to dissolve as water is poured through the funnel, thereby disinfecting the water. The size of the funnel opening, size of the outlet, and the size and number of chlorine tablets may be adjusted to achieve a desired chlorine dosing in the water. The water may be stored in the tank (3804) until such a time that the user desires to draw water for consumption.

During the storage time, the chlorine may actively disinfect the water. The size of the tank and the maximum outlet flow rate are variables that the system designer or system installer may adjust to achieve an appropriate chlorine CT exposure in the water.

In one embodiment the manual pumping system is a manually activated piston pump, illustrated in FIG. 38. Although a manually activated piston is used in the current embodiment, different kinds of pumps could be used to activate the water flow. In other embodiments, a different manual pumping system is employed such that the system is operational without access to electricity or pressurized plumbing.

When water is drawn from the tank for consumption it first passes through a press block of activated carbon (3806). Optionally, a pleated filter media may be installed over the carbon block to filter large particles and prevent clogging of the carbon block. In some circumstances the water head pressure in a small residential sized tank (about 5 gallons) is not sufficient to cause the water to flow through the filter block. Therefore, a manually operated piston pump may be installed on the outlet post of the filter. When the piston pump handle (3814) is lifted, the piston (not shown) inside the body (3812) creates a negative pressure differential compared to the water pressure on the inlet side of the filter block. This causes water to flow through the filter block, into the filter outlet (3808), and up into the body of the pump (3812). As the water is drawn up through the body of the pump it passes through the one-way rubber flapper valve (3810). Also, as new water is drawn into the body (3812) it displaced water already present therein. The displaced water escapes through the water spout (3816) at the top of the pump. The diameter and stroke length of the piston are the variables for the system designer or system installer to adjust to achieve the desired water flow delivery per stroke. For example, given a stroke duration of 2 seconds and a piston volume of 126 ml, a net flow rate of 3780 m (about one gallon) 1 per minute may be achieved.

In some gravity feed water treatment systems, small volume tanks develop very little head pressure, due to the lack of water depth or other reasons. In the embodiment show in FIG. 38, the system includes a pressed carbon block filter media with a pleated prefilter. The carbon block with pleated prefilter may provide substantially equivalent filtration to an electrically powered water purifier. Some gravity fed water treatment systems do not develop enough head pressure for water to flow through some carbon block filter media. However, a manual pumping system installed on the outlet side of the filter media provides assistance and allows for appropriate flow rates to be achieved. When the pump is activated a negative pressure is developed on the outlet, thus resulting in a net differential pressure across the media to hasten water flow.

An assembly tray (3818) may be included to hold the carbon block filter, prefilter, and pump in place at the bottom of the storage tank (3804). The assembly tray may also help keep the filter and pump from being damaged during shipping.

Instead of a funnel a tubular or other enclosed chlorine delivery component may be used to dose the incoming water with chlorine. For example, any chlorine delivery components that are used to achieve any of the chlorination processes discussed above may be used in conjunction with the manual pump system.

In one embodiment, instead of adding chlorine to the water as it pours through the funnel (or other suitable chlorine introduction device), liquid, powder, or one or more tablets may be manually mixed into the water in a separate bucket and then poured into the safe storage container.

In the event that a user has access to plumbed water then a hose connected to a faucet or diverter valve on a faucet may be used to fill the safe storage container. The use of the safe storage container with disinfection may be beneficial in circumstances where the plumbed water is contaminated. Also, in cases where the water supply is intermittent or the water pressure in the plumbing system is very low, then the safe storage container may provide accessible water.

Although the above embodiment is discussed in the context of chlorine, other disinfection chemical agents may be used. For example, bromine, iodine, or any other suitable agent may be used instead of or in addition to chlorine. In some systems, a disinfection chemical may not be necessary.

Although the current embodiment utilizes a high performance pressed carbon filter, a lower performing filter may be used. For example, in one alternative embodiment, a filter may be used simply to remove the chlorine taste from the water. In another alternative embodiment, a lower cost filter may be utilized.

The pump system described in connection with the current embodiment is a piston pump with a bicycle tire pump handle action. In alternative embodiments, a lever linkage may be added to operate the pump with a lever type of motion. In other embodiments, different type of pump system may be utilized to draw water at an appropriate flow rate. For example, instead of a linear motion working the action of the pump, a rotary crank assembly may be used to translate rotation motion into oscillating linear motion. In another alternative embodiment, instead of a piston pump, other types of pumps could be used such as a crank driven peristaltic pump.

XI. Flocculation Funnel

Figure 39:
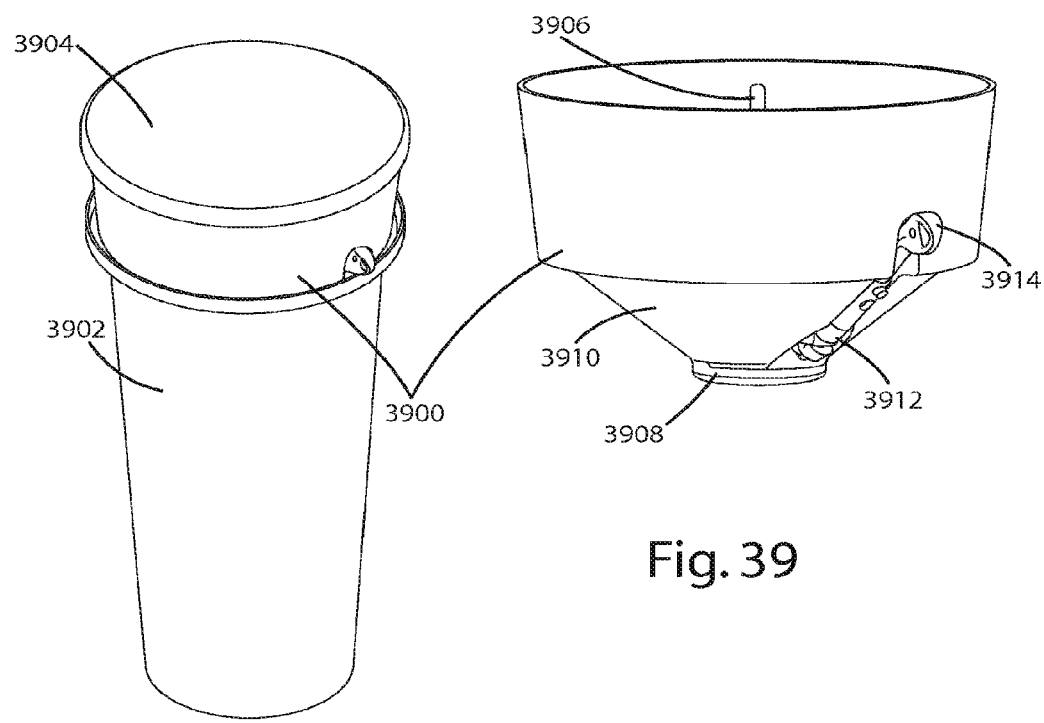
FIG. 39 illustrates a perspective view of one embodiment of a water treatment system with a flocculant funnel.
Figure 40:
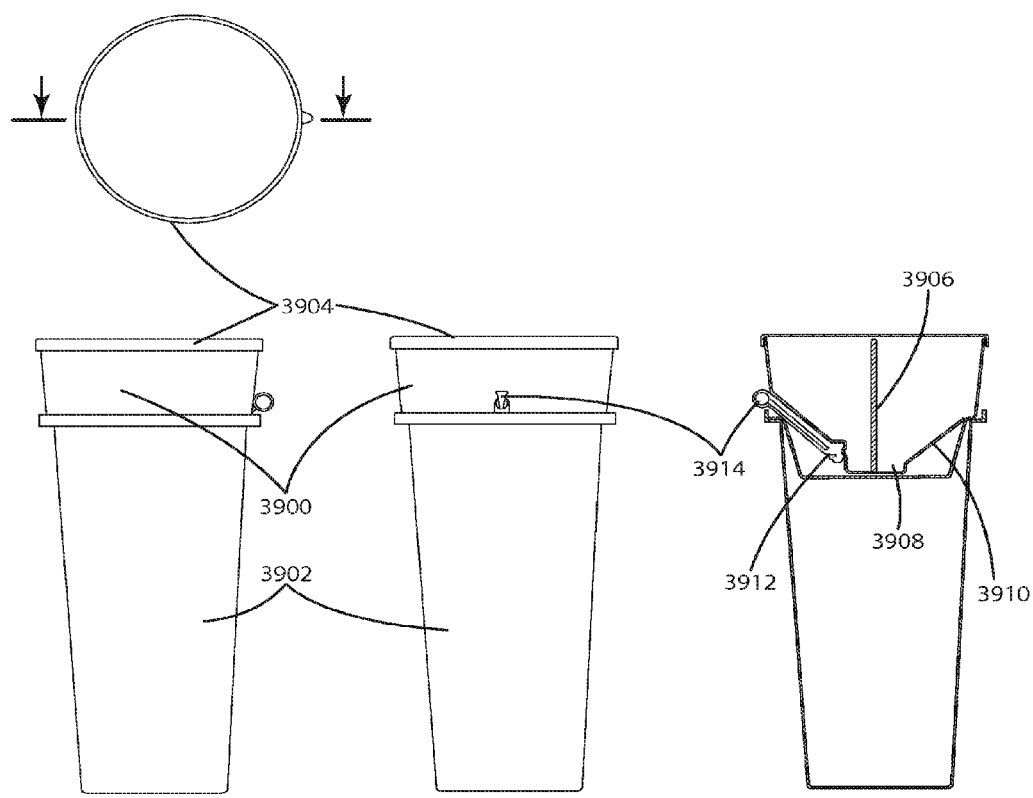
FIG. 40 illustrates a top view and several side views of one embodiment of a water treatment system with a flocculant funnel.

Referring to FIGS. 39 and 40, the water treatment system may include a flocculation tank or funnel (3900) that cooperates with a mini-biosand filter. In the current embodiment, the flocculation funnel (3900) nests on top of the mini-biosand water filter (3902). A cover (3904) for the flocculation funnel may replace the mini-biosand filter cover.

When water and flocculation chemicals are added to the flocculation tank (3900) they may be stirred with the ladle (3906). While the flocculation process is occurring, the ladle (3906) may be stored in the flocculation tank (3900), perhaps as best shown in FIG. 41, with the scoop of the ladle nested into the sump area (3908) of the flocculation tank (3900). When the particles in the water coagulate and settle to the bottom of the tank they are directed to fall into the sump area (3908) by the angled wall (3910) of the tank. In the current embodiment, the angle of the wall is set at a minimum of 30 degrees from the horizontal to help ensure that sediment will fall down into the sump area (3908). In alternative embodiments, the angle of the wall may be set at a different angle.

When the coagulation and settling process is complete the ladle (3906) may be full of particles. The outlet valve (3912) is above the layer of settled particles in the ladle (3906). Therefore, the height of the outlet valve (3912) will determine the volume of settled particles captured by the sump area (3908). Optionally, the height of the outlet valve (3912) may be adjusted, or additional outlet ports may be added. Perhaps as best shown in FIG. 41, a user may actuate the valve handle (3914) to open the outlet valve (3912) and allow water to drain from above the sediment in the ladle (3906). In the current embodiment, the water draining from the outlet valve (3912) flows directly into the mini-biosand filter system, which then proceeds to operate as described above to further filter and treat the water. The design of the outlet valve is such that the water flow is kept at a rate slow enough not to disturb the sediment in the sump/ladle area. In alternative embodiments, the outlet valve may flow into a different filter system or storage container. Referring to FIG. 42, the ladle may be removed from the sump in order to empty collected sediment or to stir the flocculation chemical into the untreated water.

The structure of the outlet of the tank, specifically the approximately vertical wall (3916) surrounding the outlet valve port, is configured to minimize flocculation deposits forming during the coagulation process. The sides of the exit structure are placed and sloped to divert the flocculation movement away from the outlet valve entrance port as it accumulates in the sump that is serviced by the ladle.

Figure 43:
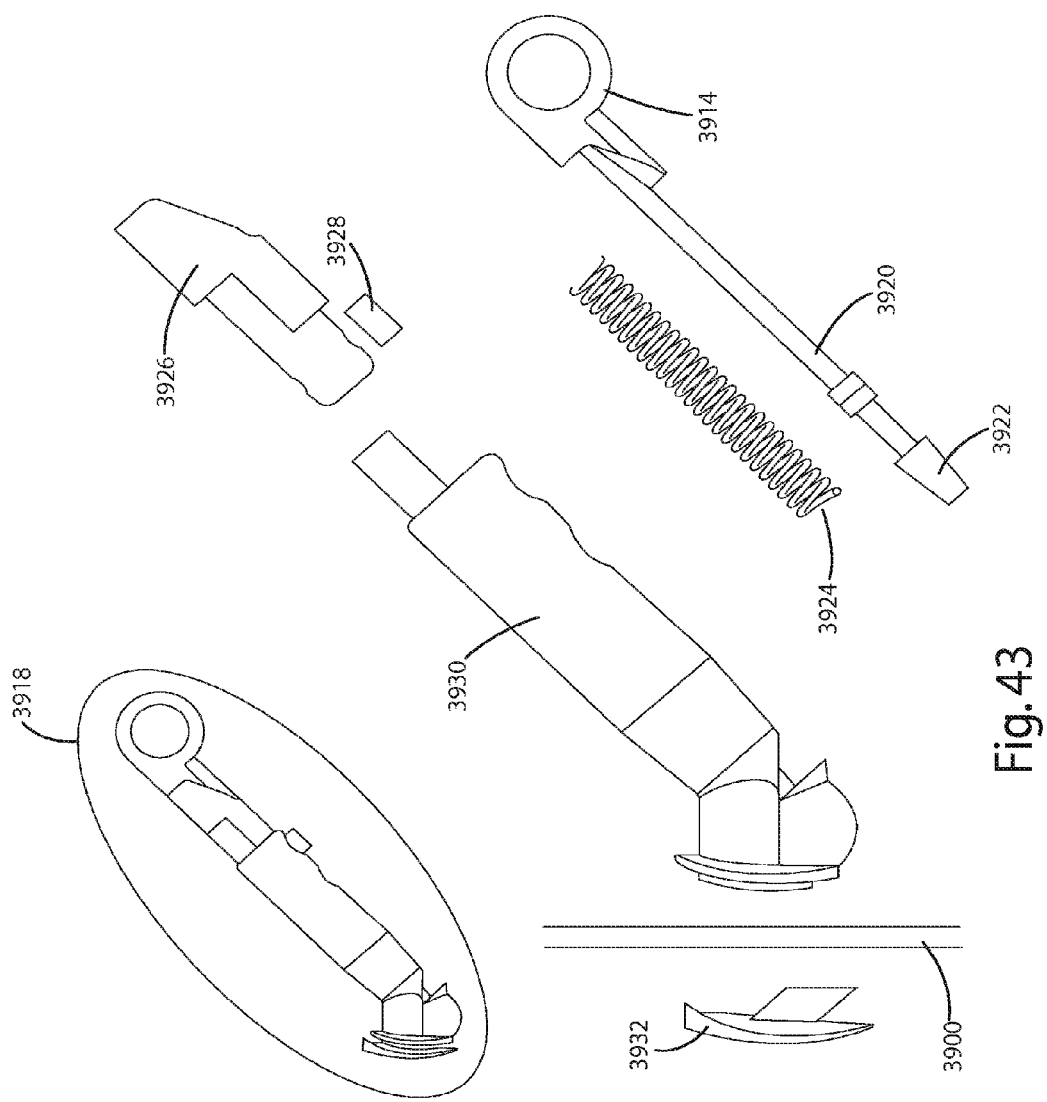
FIG. 43 illustrates an exploded view of a portion of the flocculant funnel described in FIG. 40 with an outlet valve.

Referring to FIG. 43, the outlet valve assembly (3918) is described in more detail. In the current embodiment, the outlet valve assembly (3918) includes a valve body (3930), a pull seat (3926), a set screw (3928), a valve handle (3914), a valve pull-rod assembly (3920), a valve stopper (3922), a valve spring (3924), and a valve body insert (3932). The valve pull-rod assembly has threaded ends and adjustment nuts for fine tuning length. As the handle (3914) is actuated, the valve stopper (3922) unplugs the outlet valve and allows water to flow. The valve spring (3924) acts to reset the valve stopper. In alternative embodiments, other configurations of outlet valve assemblies may be implemented that use additional, different, or fewer components.

XII. Foam Constructions

Bio-sand filtration systems may reduce microbial concentrations in the water by flowing through a biological layer formed on the surface of a bed of sand and gravel. These systems can use large quantities of sand and gravel to filter the water making them heavy, difficult to clean, transport and maintain. For example, it can be cumbersome to ship large quantities of sand and in some locations it may be difficult to locally source sand.

In one construction, some or all of the sand may be replaced by one or more foam filter elements. The foam is lighter, easier to produce and easier to ship from a centralized location. The installation process can also be easier and can be performed by inexperienced users.

The biological layer forms on top of the foam and creates a significant drop in particulate concentration in the outlet water.

The foam pore density in the current embodiment is about 100 pores per inch. In alternative embodiments, the pore density may be adjusted depending on the application. Multiple layers of foam may be used to fill the container volume. In order to control flow rate and face velocity a restriction orifice may be placed on the water outlet pipe or hose. Polyurethane foam is stable for multiple years and will not be consumed be the microbes. Further, it is available in formulations that pass NSF for water contact.

Figure 44:
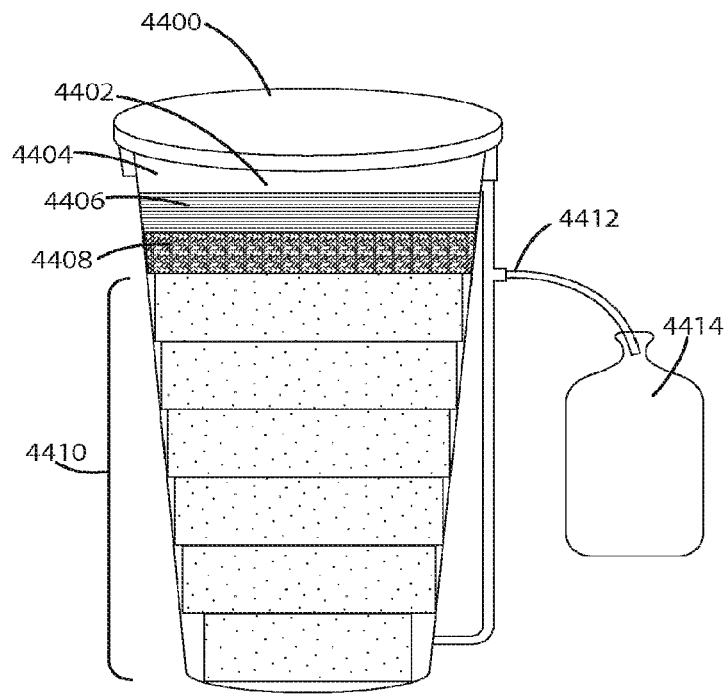
FIG. 44 illustrates one embodiment of a filtration system including foam filter media.
Figure 46:
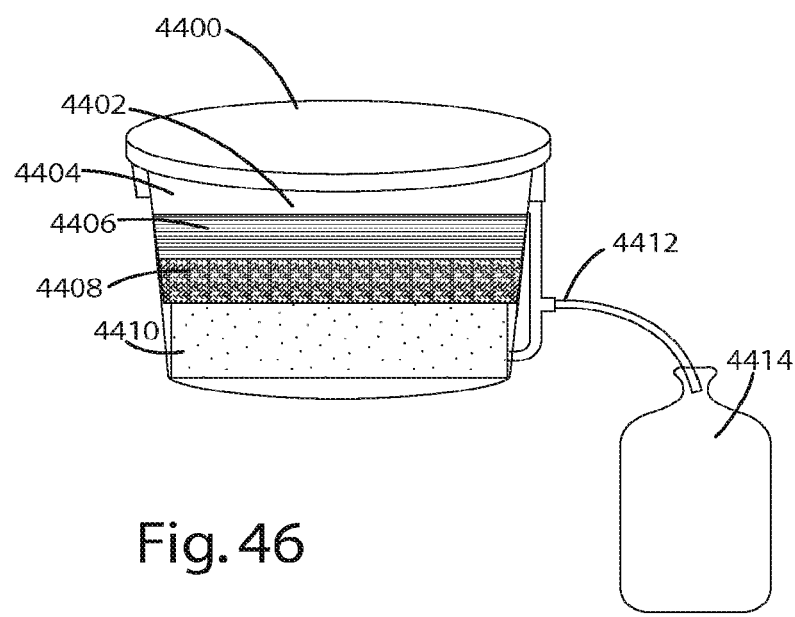
FIG. 46 illustrates a filtration system with a shallow foam filter according to at least one embodiment.

An exemplary filter system including a foam filter is illustrated in FIGS. 44 and 46. The filtration system includes a tank (4404), a lid (4400), a diffuser layer (4406), a biological layer (4408), and polyurethane foam (4410). In the current embodiment, the polyurethane foam is cut into blocks for easy stacking and fitting into the cone shaped tank. Alternatively, a single cone shaped block of foam may be used. Although blocks are used in the illustrated embodiment, different shapes and sizes of foam may be employed depending on the application or interactions with the tank. Untreated water is poured into the top of the tank (4402) and exits the tank through the outlet pipe (4412) into a treated water storage container (4414).

Figure 45:
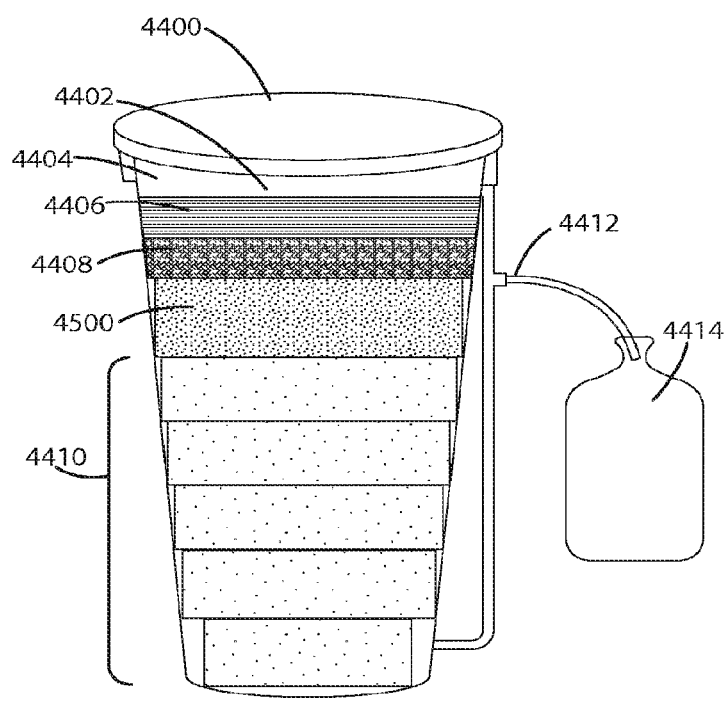
FIG. 45 illustrates a filtration system including foam filters and a shallow sand layer according to at least one embodiment.

In an alternative embodiment, illustrated in FIG. 45, a shallow layer of sand (4500) may be added to the top of the foam stack to promote better formation of the biological layer. Although multiple layers of foam are illustrated in the FIG. 44 and FIG. 45 embodiments, in alternative embodiments a single shallow layer of foam may be used, which would reduce the overall height of the system.

In another alternative embodiment, a sheet of foam may be rolled into a cylinder and capped to form a radial flow filter element. A radial flow filter block is illustrated in FIGS. 19 and 20A-20B and was previously described. As described above, the filter blocks were constructed from sand or activated carbon, pressed and held together with an ultra high molecular weight polyethylene binder. In the current embodiment, the radial filter blocks may be constructed from a sheet of foam rolled into a cylinder and capped on the ends. Additional filter blocks may be added to scale up the system to any size using filter block tees or any other filter connection system.

Figure 47:
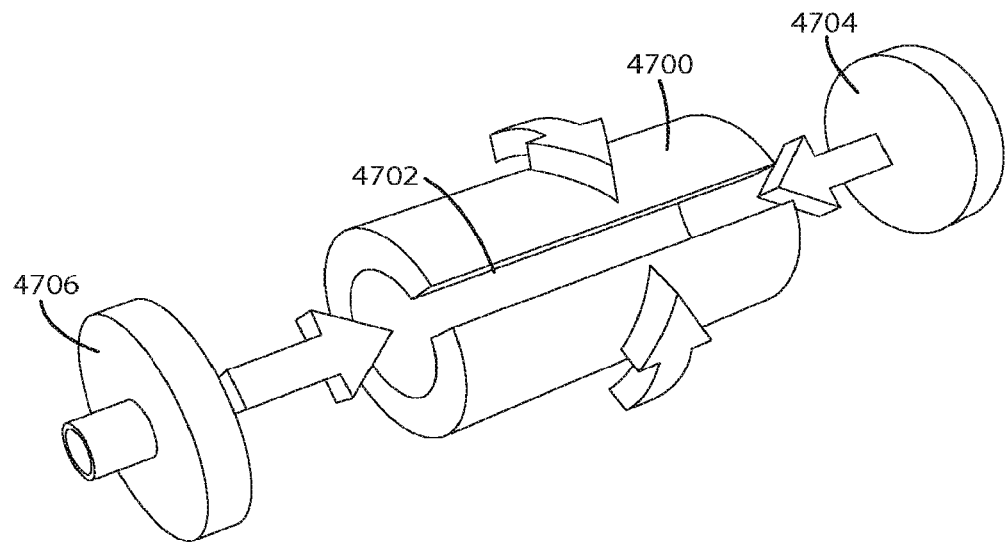
FIG. 47 illustrates a method of constructing a radial foam filter block according to at least one embodiment.

An exemplary construction of a radial flow foam filter block is illustrated in FIG. 47. In one embodiment, the method includes the steps of 1) rolling a sheet of foam into a cylinder (4700); 2) gluing along the seam (4702); 3) gluing a closed end cap to one end of the cylinder (4704); and 4) gluing an open end cap, with a pipe fitting, to the other end of the foam cylinder (4706). In alternative embodiments, different methods of construction of a foam filter block may be used including additional or fewer components and additional or fewer steps.

A pre-filter media may be used to cover the surface of either the end-flow configuration or the radial flow configuration in order to allow easier cleaning and reduce clogging of the foam pores.

In alternative embodiments, other foamed or porous materials or structures may replace the polymeric foam described above. For example, glass, metal, or other matrixes made by fusing small beads of a substance may be used. One exemplary embodiment includes porex sintered polyethylene, which also may work as a support for bio-formation.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A gravity fed water treatment system comprising:
a flocculation system including a flocculation system inlet for receiving water and a flocculation system outlet for dispensing flocculant-treated water, the flocculation system including a flocculation tank for use with a flocculant agent for encouraging coagulation and settling of particles suspended in the water in the flocculation tank;
a foam filter system having a foam filter system inlet for receiving water, the foam filter system including a foam filter element for filtering microbes and particles out of the water and capable of facilitating growth of biological organisms for treating the water;
including a manually operable valve capable of selectively dispensing flocculant-treated water along a flocculation system outlet water path to the flocculation system outlet;
a restriction orifice for restricting water through the foam filter element to control a flow rate and face velocity of the water; and
a water treatment system outlet for dispensing treated water that has passed through the flocculation system and the foam filter system.

2. The gravity fed water treatment system of claim 1 including a chlorine source for disinfecting the water.

3. The gravity fed water treatment system of claim 2 including an activated carbon filter for removing chlorine from the water.

4. The gravity fed water treatment system of claim 1 wherein the foam filter system includes two foam filter elements plumbed in parallel with network piping from each foam filter element outlet that merges the filtered water for delivery through the water treatment system outlet, and wherein the water treatment system outlet includes the restriction orifice.

5. The gravity fed water treatment system of claim 4 wherein the foam filter system includes a pre-filter media covering each of the foam filter elements.

6. The gravity fed water treatment system of claim 4 wherein the foam filter elements are radial flow filters.

7. The gravity fed water treatment system of claim 1 wherein the flocculation system outlet water path originates at a level within the flocculation tank above a predetermined expected depth of sediment accumulation during a settling period of flocculation.

8. A gravity fed water treatment system comprising:
a first container having a first container inlet for receiving untreated water and a first container outlet for dispensing flocculant-treated water, the first container for use with a flocculant agent for encouraging coagulation and settling of particles suspended in the water, the first container including a manually operable valve capable of selectively dispensing flocculant-treated water from the first container via the first container outlet; and
a second container having a second container inlet for receiving the flocculant-treated water, a second container outlet for dispensing disinfected water, and dual radial foam filters for filtering microbes and particles out of the water, each radial foam filter capable of facilitating growth of biological organisms for treating the water, the dual radial foam filters plumbed in parallel by a conduit fitting having two inlets and a single outlet in communication with the second container outlet;
a restriction orifice for restricting water through the dual radial foam filters to control a flow rate and face velocity of the water; and
wherein the first and second containers are nestable and stackable.

9. The gravity fed water treatment system of claim 8, including a chlorine source for disinfecting the water.

10. The gravity fed water treatment system of claim 9 including an activated carbon filter for removing chlorine from the chlorinated water.

11. The gravity fed water treatment system of claim 8 wherein the second container outlet includes the restriction orifice for controlling a maximum face velocity of the water through the radial foam filters to provide effective filtration of the water.

12. The gravity fed water treatment system of claim 8 including a pre-filter media covering each of the dual radial foam filters.

13. The gravity fed water treatment system of claim 8 wherein a flocculation system outlet water path originates at a level within the first container above a predetermined expected depth of sediment accumulation during a settling period of flocculation.

14. The gravity fed water treatment system of claim 13 wherein the manually operable valve selectively dispenses flocculant-treated water along the flocculation system outlet water path to the first container outlet.

* * * * *